US012476430B2

(12) United States Patent
Bodzay et al.

(10) Patent No.: US 12,476,430 B2
(45) Date of Patent: Nov. 18, 2025

(54) SINGLE PAIR ETHERNET (SPE) CONNECTOR AND SYSTEM

(71) Applicant: BELDEN CANADA ULC, Saint-Laurent (CA)

(72) Inventors: Michael Bodzay, Dollard-des-Ormeaux (CA); Virak Siev, Montreal (CA); Jean-Sebastien Plamondon, Laval (CA); Ronald Tellas, St. Augustine, FL (US); Alain Desrochers, Les Cedres (CA); Michael Nolsoe Larsen, Skanderborg (DK); Rene Klosterskov, Bjerringbro (DK); Nicolai Hjalte Vester, Sabro (DK)

(73) Assignee: BELDEN CANADA ULC, Saint-Laurent (CA)

( * ) Notice: Subject to any disclaimer, the term of this patent is extended or adjusted under 35 U.S.C. 154(b) by 360 days.

(21) Appl. No.: 18/104,513

(22) Filed: Feb. 1, 2023

(65) Prior Publication Data

US 2023/0246404 A1 Aug. 3, 2023

Related U.S. Application Data

(60) Provisional application No. 63/305,440, filed on Feb. 1, 2022.

(51) Int. Cl.

*H01R 13/00* (2006.01)
*H01R 13/629* (2006.01)
(Continued)

(52) U.S. Cl.

CPC ..... *H01R 25/003* (2013.01); *H01R 13/62933* (2013.01); *H01R 24/62* (2013.01); *H01R 2201/04* (2013.01)

(58) Field of Classification Search

CPC . H01R 13/62933; H01R 24/62; H01R 25/003
See application file for complete search history.

(56) References Cited

U.S. PATENT DOCUMENTS 5,181,858 A * 1/1993 Matz .................. H01R 13/6658 439/489
5,199,891 A * 4/1993 Reed ................ H01R 13/65914 439/98
(Continued)

FOREIGN PATENT DOCUMENTS

DE 102020115922 A1 12/2021
WO 2016137486 A1 9/2016
(Continued)

OTHER PUBLICATIONS

I International Search Report and Written Opinion of the International Searching Authority dated Apr. 14, 2023, for PCT/CA2023/050138 filed Feb. 1, 2023, 18 pages.

*Primary Examiner* — Phuong Chi Thi Nguyen
(74) *Attorney, Agent, or Firm* — MH2 Technology Law Group, LLP

(57) ABSTRACT

An assembly configured to receive twisted pairs of conductors terminated by a miniplug and a pair of conductor contacts. The assembly comprises a housing comprising a first surface comprising a socket disposed therein; wherein the socket is configured to accept a plurality of miniplugs, illustratively in a 2×2 configuration, wherein pairs of socket contacts are exposed along at least one side wall of the socket and wherein the socket contacts are configured to be aligned with the conductor contacts such that each of the conductor contacts is in contact with a respective one of the socket contacts. A caddy is also provided which allows the miniplugs to be arranged in a 2×2 arrangement for subsequent insertion into a socket or the like.

20 Claims, 30 Drawing Sheets

(51) Int. Cl.

| | |
|---|---|
| ***H01R 24/62*** | (2011.01) |
| ***H01R 25/00*** | (2006.01) |

(56) References Cited

U.S. PATENT DOCUMENTS

| | | | | | |
|---|---|---|---|---|---|
| 5,240,436 | A * | 8/1993 | Bradley | H01R 13/516 439/654 |
| 5,366,388 | A * | 11/1994 | Freeman | H01R 13/74 439/540.1 |
| 5,592,739 | A * | 1/1997 | Ferrill | H01R 43/01 156/290 |
| 5,816,832 | A * | 10/1998 | Aldous | G06F 1/1632 439/131 |
| 6,338,643 | B1 * | 1/2002 | Miller | H01R 4/2433 439/417 |
| 6,629,858 | B2 | 10/2003 | Lo et al. | |
| 7,572,148 | B1 | 8/2009 | Pepe et al. | |
| 8,100,701 | B2 | 1/2012 | Gerber et al. | |
| 10,673,173 | B2 | 6/2020 | Kawahara | |
| 2018/0034192 | A1 | 2/2018 | Leigh et al. | |
| 2021/0376518 | A1 | 12/2021 | De Bolle et al. | |

FOREIGN PATENT DOCUMENTS

| | | | |
|---|---|---|---|
| WO | 2017127926 | A1 | 3/2017 |
| WO | 2021252938 | A1 | 12/2021 |

* cited by examiner

SINGLE PAIR ETHERNET (SPE) CONNECTOR AND SYSTEM

CROSS REFERENCE TO RELATED APPLICATIONS

The present application claims benefit of U.S. provisional application Ser. No. 63/305,440 filed on Feb. 1, 2022 which is incorporated herein in its entirely by reference.

FIELD OF THE INVENTION

The present invention relates to a Single Pair Ethernet (SPE) connector and system.

BACKGROUND TO THE INVENTION

Single Pair Ethernet (SPE) is a standard for Ethernet communication that uses only a single pair of wires to transmit data. This allows for more efficient use of wiring and cabling resources and can also reduce the cost and complexity of networking infrastructure.

The single pair ethernet is a subset of the IEEE 802.3 standard for Ethernet. It is also an alternative to other industrial communication protocols such as PROFINET or PROFIBUS.

Power may be sent over Single Pair Ethernet (SPE) using Power over Data Line (PoDL) or Power over SPE (SPoE). As known in the art, PoDL and SPoE allow power to be transmitted over the same cable as data, which eliminates the need for separate power cables or outlets.

In the case of Single Pair Ethernet, PoDL and SPoE can be used to power devices such as sensors, cameras, and other IoT devices that are connected to the network. The technology is also known as IEEE 802.3cg and it is a subset of the IEEE 802.3 standard.

The prior art discloses SPE cables comprising two contact plugs at either end which terminate the cables. One drawback of such SPE cables is that they cannot be easily connected to four-pair Ethernet cables and equipment. Another drawback is that individual SPE cables cannot be readily connected with a plurality of other SPE cables.

SUMMARY OF THE INVENTION

The present addresses the above and other drawbacks by providing an assembly configured to receive four twisted pairs of conductors each terminated by a respective miniplug, each miniplug comprising a pair of conductor contacts exposed on an outer surface and interconnected with a respective conductor of the respective twisted pair of conductors. The assembly comprises a housing comprising a first surface comprising a socket disposed therein, wherein the socket is configured to accept the four miniplugs arranged in a 2×2 configuration, wherein four pairs of socket contacts are exposed along at least one side wall of the socket, and wherein the socket contacts are configured to be aligned with the conductor contacts such that each of the conductor contacts is in contact with a respective one of the socket contacts.

In some embodiments the assembly further comprises a caddy configured to accept the four miniplugs arranged in the 2×2 configuration and wherein the socket is configured to accept the caddy.

In some embodiments of the assembly in the 2×2 configuration the conductor contacts of a first pair of the miniplugs face outwards in a first direction and the conductor contacts of a second pair of the miniplugs face outwards in a second direction opposite the first direction.

In some embodiments of the assembly the housing further comprising a second surface opposite the first surface comprising an RJ-45 compatible receptacle disposed therein wherein eight tines are exposed within the RJ-45 compatible receptacle, and wherein each of the socket contacts is interconnected with a respective one of the tines.

In some embodiments of the assembly the housing further comprising a second surface opposite the first surface comprising an RJ-45 compatible plug disposed thereon, wherein eight terminal contacts are exposed along a front thereof and wherein each of the socket contacts is interconnected with a respective on of the terminal contacts.

In some embodiments of the assembly each of the miniplugs comprise a feature which interlocks with a complementary feature of each adjacent miniplug when the miniplugs are arranged in a 2×2 configuration.

In some embodiments of the assembly each of the miniplugs are alike.

In some embodiments of the assembly the housing is configured to mount in a keystone compatible opening.

In some embodiments of the assembly comprises four Single Pair Ethernet (SPE) cables, each cable comprising a jacket surrounding a respective one of the four twisted pair of conductors.

There is also provided a miniplug configured for terminating a single twisted pair of conductors and arrangement with other like plugs to form a block. The miniplug comprises a main body comprising a pair of passages each configured to receive a conductor, a pair of contacts, a pair of features on an outer surface of the main body, wherein each of the passages is configured to receive an end of a respective one of the conductors, wherein each of the contacts comprises a first end configured to intersect with a respective one of the passages and interconnect with the conductor received within the passage and a second end exposed on an outer surface of the main body, wherein a first one of the pair of features is configured to complement a second one of the pair of features, and wherein the first feature is configured to interlock with the second feature of an adjacent like miniplug such that the miniplug and the adjacent miniplug form a block.

In some embodiments of the miniplug the pair of contacts are arranged side-by-side.

In some embodiments of the miniplug the first one of the pair of features comprises a rod and the second one of the pair of features comprises a groove and wherein the rod is configured for sliding into the groove.

In some embodiments of the miniplug the rod comprises neck and the groove comprises a mouth and on insertion of the rod into the groove, the neck is held within the mouth.

In some embodiments of the miniplug the passageways are elongate and the pair of contacts are at right angles to the elongate passageways.

In some embodiments of the miniplug the conductor receiving passages are arranged in parallel to one another.

In some embodiments of the miniplug each of the conductors is covered by an insulating jacket and wherein each of the first ends of the contacts is configured to pierce the jacket.

In some embodiments the miniplug comprises an elongate release lever comprising a fixed end secured to an outer surface of the main body and a flexible free end configured to extend away from the main body.

In some embodiments of the miniplug the passages are interconnected along a length thereof.

Also there is provided an assembly configured for providing a common ground connection between two twisted pairs of conductors, a first of the twisted pairs terminated by a first plug and a second of the twisted pairs terminated by a second plug, the first twisted pair comprising a first shield exposed adjacent the first plug and the second twisted pair comprising a second shield exposed adjacent the second plug. The assembly comprises a housing comprising a first surface comprising a socket disposed therein, the socket comprising a first portion configured to receive the first plug and a second portion configured to receive the second plug, a retainer mechanism between the first portion and the second portion, wherein the retainer mechanism comprises a first conductive part and a second conductive part interconnected to the first conductive part, wherein the first conductive part is biased towards the first portion and the second conductive part is biased towards the second portion, wherein the first conductive part is configured to engage with the shield of the first plug and the second conductive part is configured to engage with the shield of the second plug when the first plug is received in the first portion and the second plug is received in the second portion, and wherein the first conductive part is configured to engage with the first plug to retain the first plug within the first portion and the second conductive part is configured to retain the second plug within the second portion.

In some embodiments of the assembly the retainer mechanism is fabricated from a metal.

In some embodiments of the assembly the retainer mechanism comprises a first lever extending away from the first conductive part and in front of the first surface and a second lever extending away from the second conductive part and in front of the first surface and wherein the first plug is disengaged from the first portion using the first lever and the second plug is disengaged from the second portion using the second lever.

In some embodiments of the assembly the first conductive part and the second conductive part are interconnected by an intermediate part and wherein the first conductive part, the second conductive part and the intermediate part are fabricated from a single piece of metal.

In some embodiments of the assembly a first end of the intermediate part is joined with an end of the first conductive part and a second end of the intermediate part is joined with an end of the second conductive part, wherein the first end and the second end are arranged opposite one another with a gap in between and wherein the first conductive part, the second conductive part and the intermediate part are fabricated from a single piece of metal.

Additionally, there is provided a coupler for interconnecting at least three Single Pair Ethernet (SPE) cables, each SPE cable comprising a twisted pair of conductors terminated by a respective miniplug, the miniplug comprising a pair of conductor contacts exposed on an outer surface thereof, each contact connected with a respective one of the conductors. The coupler comprises a main body comprising an outer surface, at least three sockets disposed in the outer surface, wherein each of the sockets comprises a first socket contact and a second socket contact disposed on an inner surface, the first and second socket contacts of one of the sockets interconnected with respective ones of the first and second socket contacts of each other of the sockets, wherein each of the at least three sockets is configured to receive a respective one of the miniplugs, and wherein the socket contacts are configured to be aligned with the conductor contacts such that each of the conductor contacts is in contact with a respective one of the socket contacts.

In some embodiments of the coupler the outer surface comprises a first surface and a second surface opposite the first surface and wherein two sockets are disposed in each of the first surface and the second surface.

In some embodiments the coupler comprises four sockets disposed in the outer surface.

In some embodiments the coupler comprises 2×N sockets disposed in the outer surface where N is an integer>2.

Furthermore, there is provided a caddy configured to provide a 2×N arrangement of miniplugs for subsequent insertion into a socket, each miniplug terminating a respective one of 2×N Single Pair Ethernet (SPE) cables each comprising a twisted pair of conductors each of the conductors interconnected with one of a pair of contacts exposed on a surface of a housing of the terminating miniplug. The caddy comprises an outer surface comprising a first end configured for insertion into the socket and a second end opposite the first end defining an entrance to 2×N chambers in a 2×N arrangement, each chamber configured to receive one of the miniplugs, an aperture between each chamber and the outer surface, the aperture configured to align with the pair of contacts of an inserted one of the miniplugs and such that the pair of contacts are exposed on the outer surface, wherein each of the chambers comprises a mouth via which the miniplug is inserted into the chamber, and wherein each chamber comprises a retaining mechanism configured to releasably retain the miniplug within the chamber.

In some embodiments of the caddy N is 2.

In some embodiments of the caddy each miniplug comprises an elongate release lever comprising a fixed end secured to the surface of each of the plugs adjacent the pair of contacts, a flexible free end configured to extend away from the housing along the SPE cable and a tab moveable with the flexible free end and wherein the retaining mechanism comprises a feature in the chamber configured to engage with the tab when the miniplug is inserted into the chamber.

In some embodiments of the caddy the feature comprises a slot configured to receive the tab and wherein the tab is biased into the slot by the flexible free end when the miniplug is inserted into the chamber.

In some embodiments of the caddy the housing of each miniplug comprises a recess and wherein the retaining mechanism comprises for each chamber a flexible lever comprising a tab configured to extend into the chamber, the flexible lever configured to bias the tab into the recess when the miniplug is inserted into the chamber.

In some embodiments of the caddy the housing of a first of the miniplugs and a second of the miniplugs each comprises a recess and wherein the retaining mechanism comprises a dual-action flexible lever between pairs of adjacent chambers, the dual-action flexible lever comprising a first tab configured to extend into the first of the pair of adjacent chambers and a second tab configured to extend into the second of the pair of adjacent chambers, wherein the dual-action flexible lever is configured to bias the first tab into the recess of the first miniplug when the first miniplug is inserted into the first chamber and the second tab into the recess of the second miniplug when the second miniplug is inserted into the second chamber.

In some embodiments of the caddy the retaining mechanism comprises a wheel configured for rotation about an axis aligned with a point of intersection between each of the four chambers, the wheel extending outwards into the mouth of each of the chambers and further wherein the wheel further comprises at least one cutaway portion such that in a first angle of rotation the cutaway portion is positioned in the mouth of a selected one of the chambers such that the miniplug can be removed from the selected chamber and a second rotation where at least part of the wheel extends into the mouth of the selected chamber such that the miniplug is prevented from being removed from the selected chamber.

In some embodiments of the caddy the wheel comprises four cutaway portions such that that in a first angle of rotation each cutaway portion is positioned in the mouth of a respective one of the chambers such that the miniplugs can be removed from each of the chambers and a second rotation where at least part of the wheel extends into the mouth of each of the chambers such that the miniplugs are prevented from being removed from the chambers.

In some embodiments of the caddy the wheel comprises a slot in a center thereof for receiving a tool for rotating the wheel.

In addition, there is provided an adaptor set for interconnecting a Single Pair Ethernet (SPE) cable comprising a twisted pair of conductors terminated by a miniplug, the miniplug comprising a pair of conductor contacts exposed on an outer surface thereof, each contact connected with a respective one of the conductors, with a plurality of different receptacles, each receptacle conforming to a different one of a plurality of IEC-63171 standards. The adaptor set comprises a plurality of different adaptors. Each adaptor comprises a first end compatible with a respective one of the IEC-63171 standards and comprising a pair of terminal contacts, a second end comprising a socket configured to receive the miniplug, wherein the socket comprises a first socket contact and a second socket disposed on an inner surface, wherein each socket contact is configured to interconnect with a respective one of the pair of conductor contacts as the miniplug is inserted into the chamber, and wherein each socket contact is interconnected with a respective one the pair of terminal contacts.

In some embodiments of the adaptor the adaptor set is for interconnecting a plurality of Single Pair Ethernet (SPE) cables each comprising a twisted pair of conductors terminated by a miniplug, wherein the second end comprises plurality of sockets each configured to receive one of the miniplugs, and wherein the first socket contacts of the plurality of sockets are interconnected and the second socket contacts of the plurality of sockets are interconnected.

There is also provided an adaptor for interconnecting a Single Pair Ethernet (SPE) cable comprising a twisted pair of conductors terminated by a miniplug, the miniplug comprising a pair of conductor contacts exposed on an outer surface thereof, each contact connected with a respective one of the conductors, with a receptacle conforming to a selected one of a plurality of IEC-63171 standards. The adaptor comprises a first end compatible with the selected IEC-63171 standard and comprising a pair of terminal contacts, a second end comprising a plurality of sockets, each socket configured to receive one of the miniplugs, wherein each socket comprises a first socket contact and a second socket disposed on an inner surface, wherein the first socket contacts of the plurality of sockets are interconnected and the second socket contacts of the plurality of sockets are interconnected, wherein each socket contact is configured to interconnect with a respective one of the pair of conductor contacts as the miniplug is inserted into the chamber, and wherein each socket contact is interconnected with a respective one the pair of terminal contacts.

The adaptor of claim 19, wherein the receptacle conforms to IEC 63171-1.

There is additionally provided a coupler for interconnecting at least two pairs of Single Pair Ethernet (SPE) cables, each SPE cable comprising a twisted pair of conductors terminated by a respective miniplug, the miniplug comprising a pair of conductor contacts exposed on an outer surface thereof, each contact connected with a respective one of the conductors. The coupler comprises a main body comprising an outer surface, at least two pairs of sockets disposed in the outer surface, wherein each of the pair of sockets comprises a first socket contact and a second socket disposed on an inner surface of a first of the sockets and a first socket contact and a second socket disposed on an inner surface of a second of the sockets, the first and second socket contacts of the first of the sockets interconnected with respective ones of the first and second socket contacts the second of the sockets, wherein each of the sockets is configured to receive a respective one of the miniplugs, and wherein the socket contacts are configured to be aligned with the conductor contacts such that each of the conductor contacts is in contact with a respective one of the socket contacts.

In some embodiments of the coupler all the first socket contacts are interconnected and all the second socket contacts are interconnected.

In some embodiments of the coupler for each pair of sockets, the first socket is configured for receiving the respective miniplug in a first orientation and the second socket is configured for receiving the respective miniplug in a second inverted orientation.

BRIEF DESCRIPTION OF THE DRAWINGS

FIG. 9 provides a raised right exploded perspective view of a cable and miniplug assembly in accordance with a first alternative embodiment of a miniplug of the present invention;

DETAILED DESCRIPTION OF THE ILLUSTRATIVE EMBODIMENTS

Figure 1A:
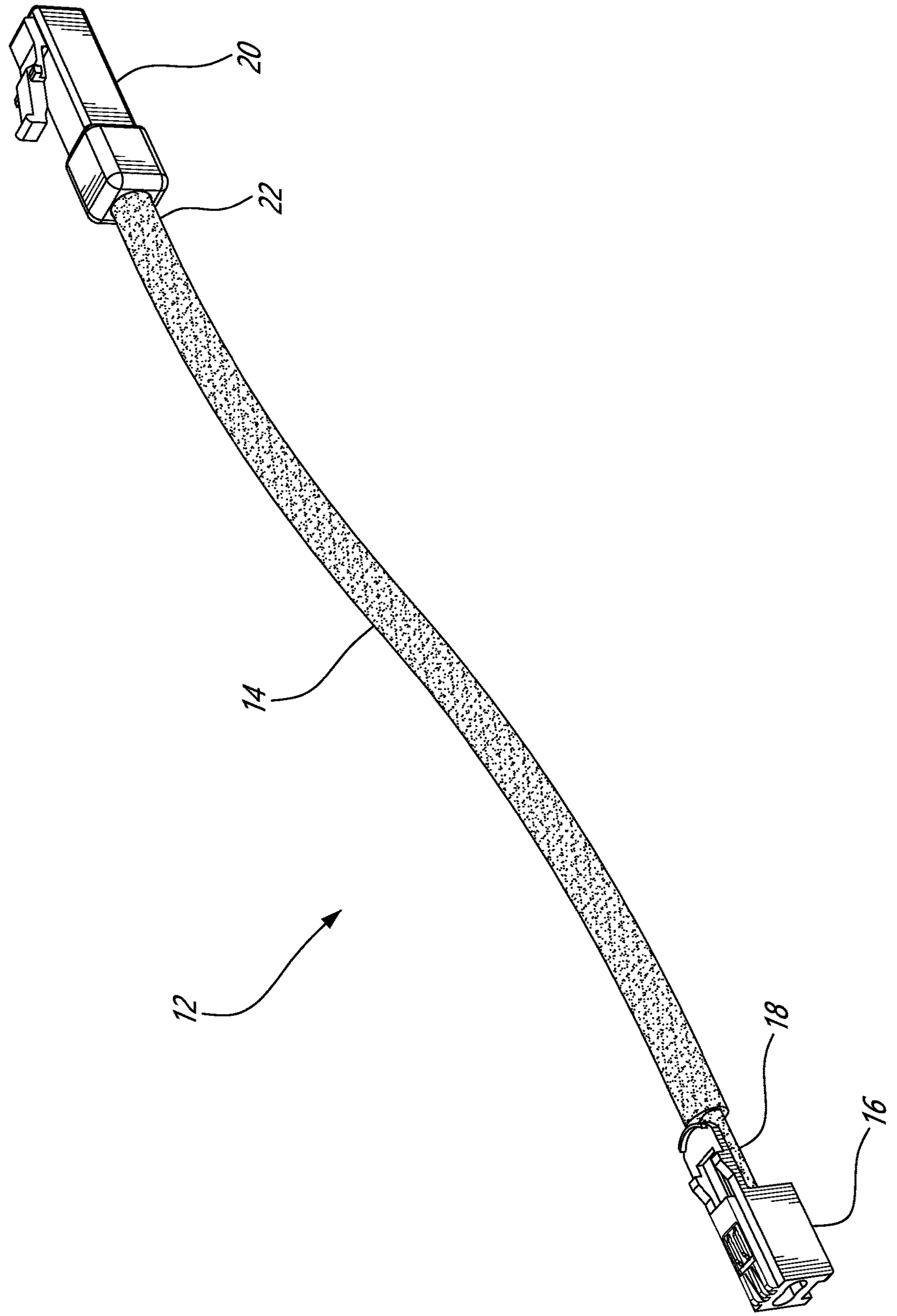
FIG. 1A provides a raised right perspective view of a single cable assembly in accordance with an illustrative embodiment of the present invention.
Figure 1B:
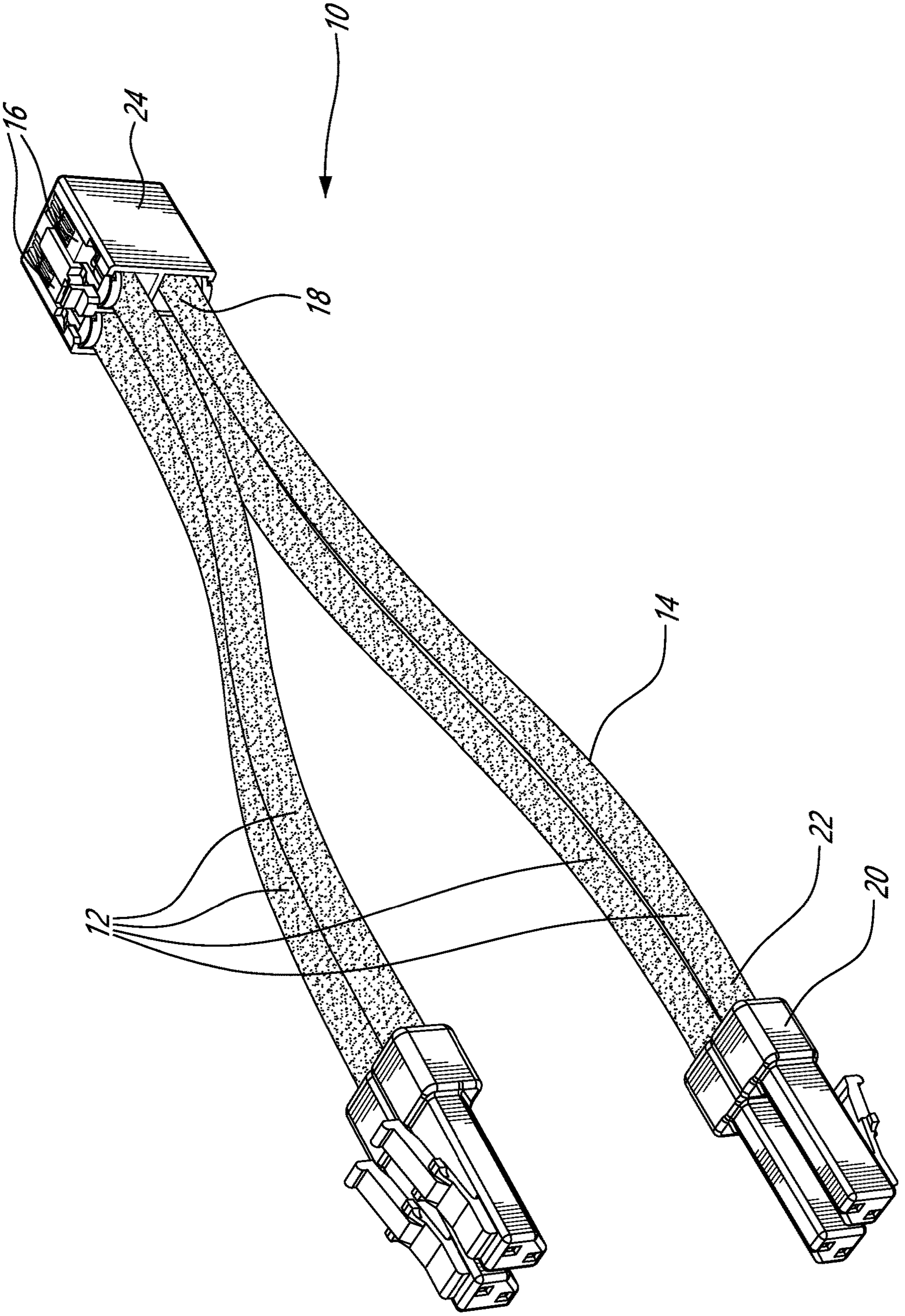
FIG. 1B provides a raised right perspective view of a multiple cable assembly in accordance with an illustrative embodiment of the present invention.

Referring now to FIGS. 1A and 1B, an SPE connector cable assembly, generally referred to using the reference numeral 10, will now be described. The assembly comprises a plurality of SPE cables 12. Each SPE cable 12 comprises a twisted pair of conductors (not shown) illustratively having a gauge of 18 AWG, although other gauges, for example between 14 AWG and 28 AWG could also be used depending on the application, and surrounded by a protective cable jacket 14. A miniplug 16 is provided at a first end 18 of the pair of conductors and a second plug 20 for example a standardised plug according to standards such as IEC-63171-X, at a second end 22 of the pair of conductors. In one embodiment, and as will be discussed in more detail below, the cables 12 may be arranged, or ganged, in a 2×2 configuration by inserting a plurality of the miniplugs 16 in a caddy 24.

Figure 2A:
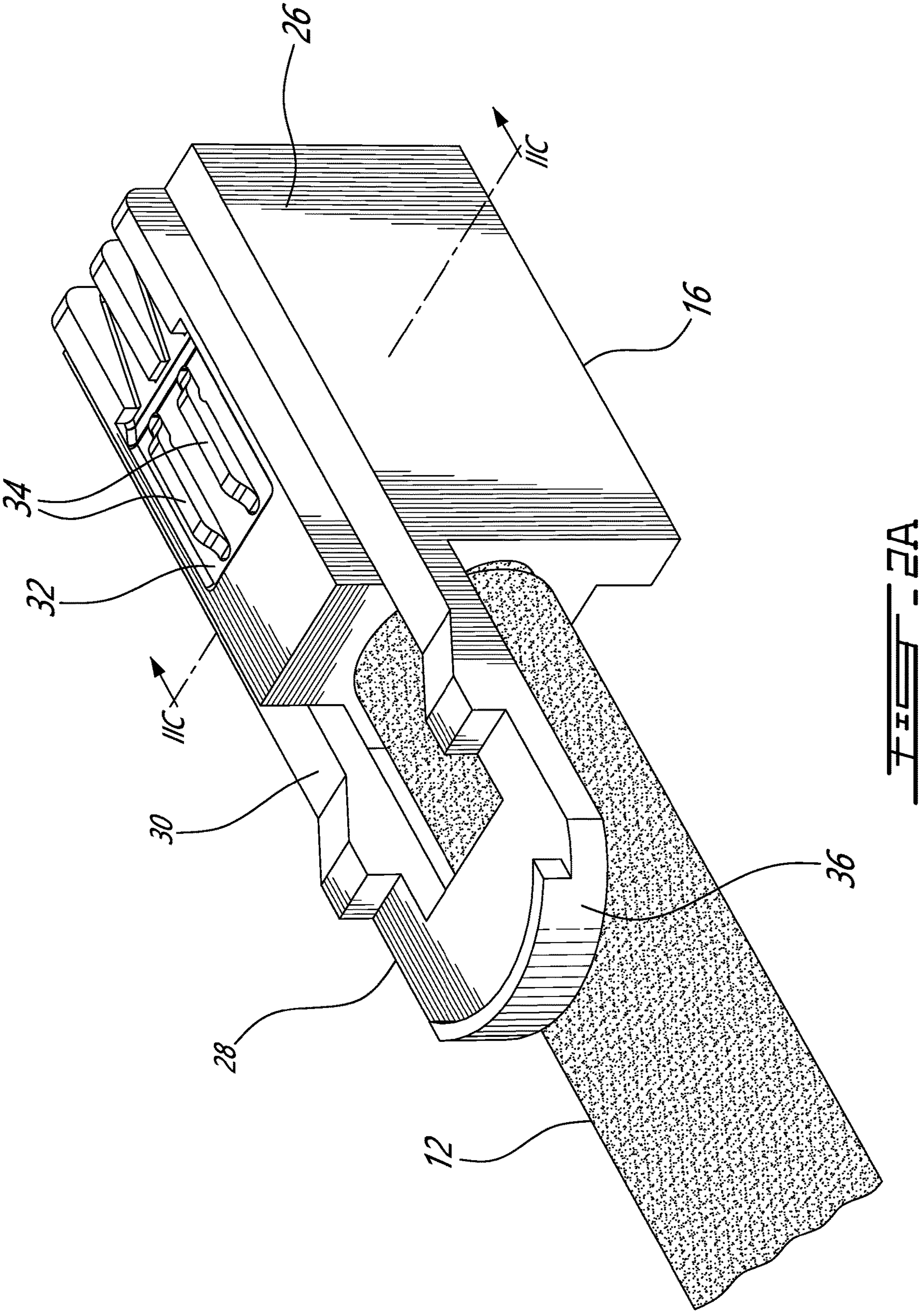
FIG. 2A provides a raised right perspective view of a connector plug in accordance with an illustrative embodiment of the present invention.

Referring to FIG. 2A in addition to FIGS. 1A and 1B, in one embodiment the miniplug 16 comprises a plug housing 26 and an elongate release lever 28 for, as will be discussed in more detail below, releasably securing the housing to a receptacle (not shown). The lever 28 comprises a fixed end 30 secured to an outer surface 32 of the plug housing 26 and adjacent a pair of piercing contacts 34. The lever 28 further comprises a free flexible end 36 extending away from the plug housing 26 along the cable 12.

Figure 2B:
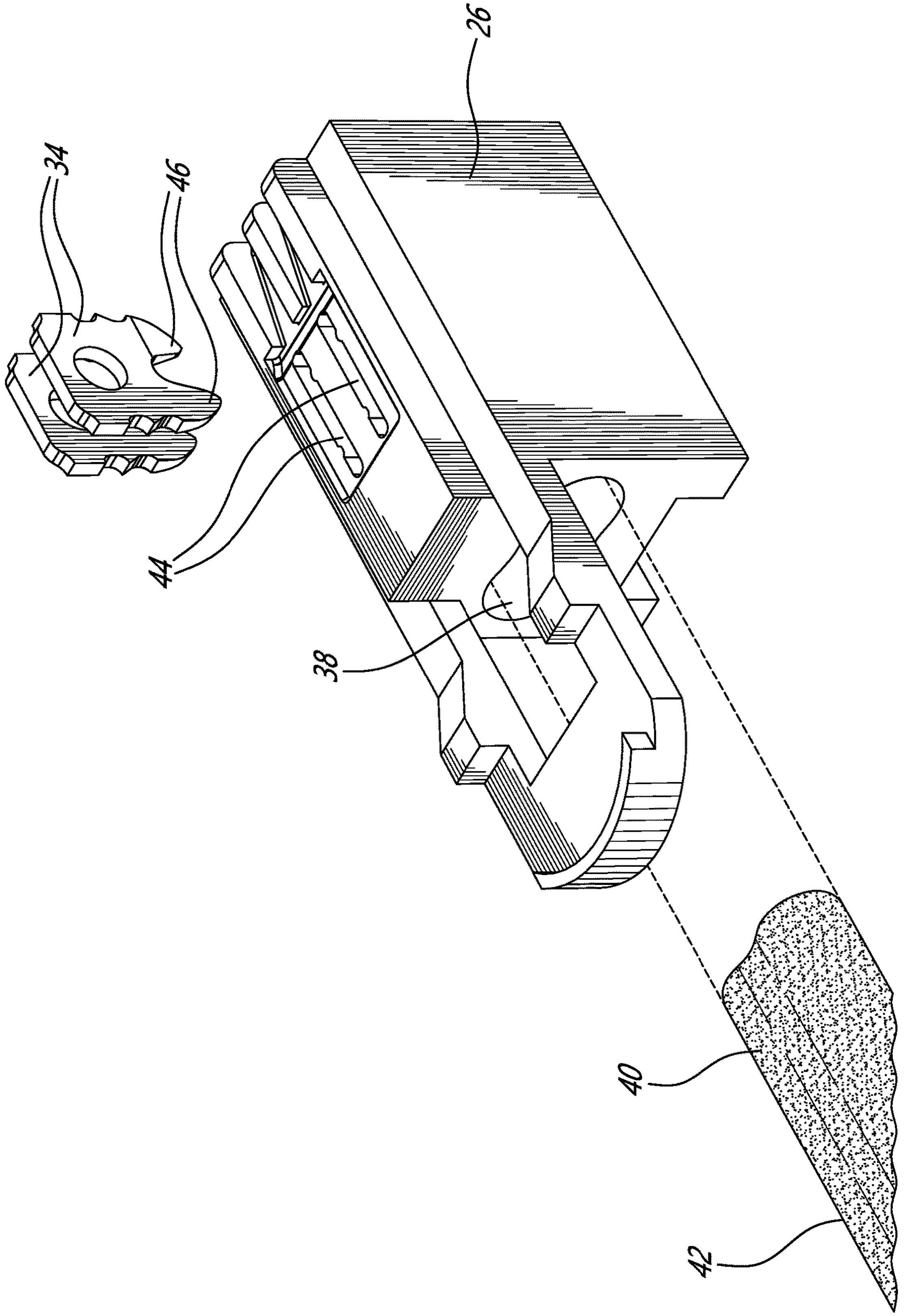
FIG. 2B provides an exploded raised right perspective view of the connector plug of FIG. 2A.

Referring to FIG. 2B in addition FIG. 2A, the plug housing 26 defines an elongate passageway 38 for receiving a first end 40 of the conductors 42 in parallel. The pair of piercing contacts 34 are fabricated from a conductive material, such as gold-plated steel or the like, and arranged side-by-side for insertion into respective ones of a pair of slots 44 and at right angles to the elongate passageway 38.

Figure 2C:
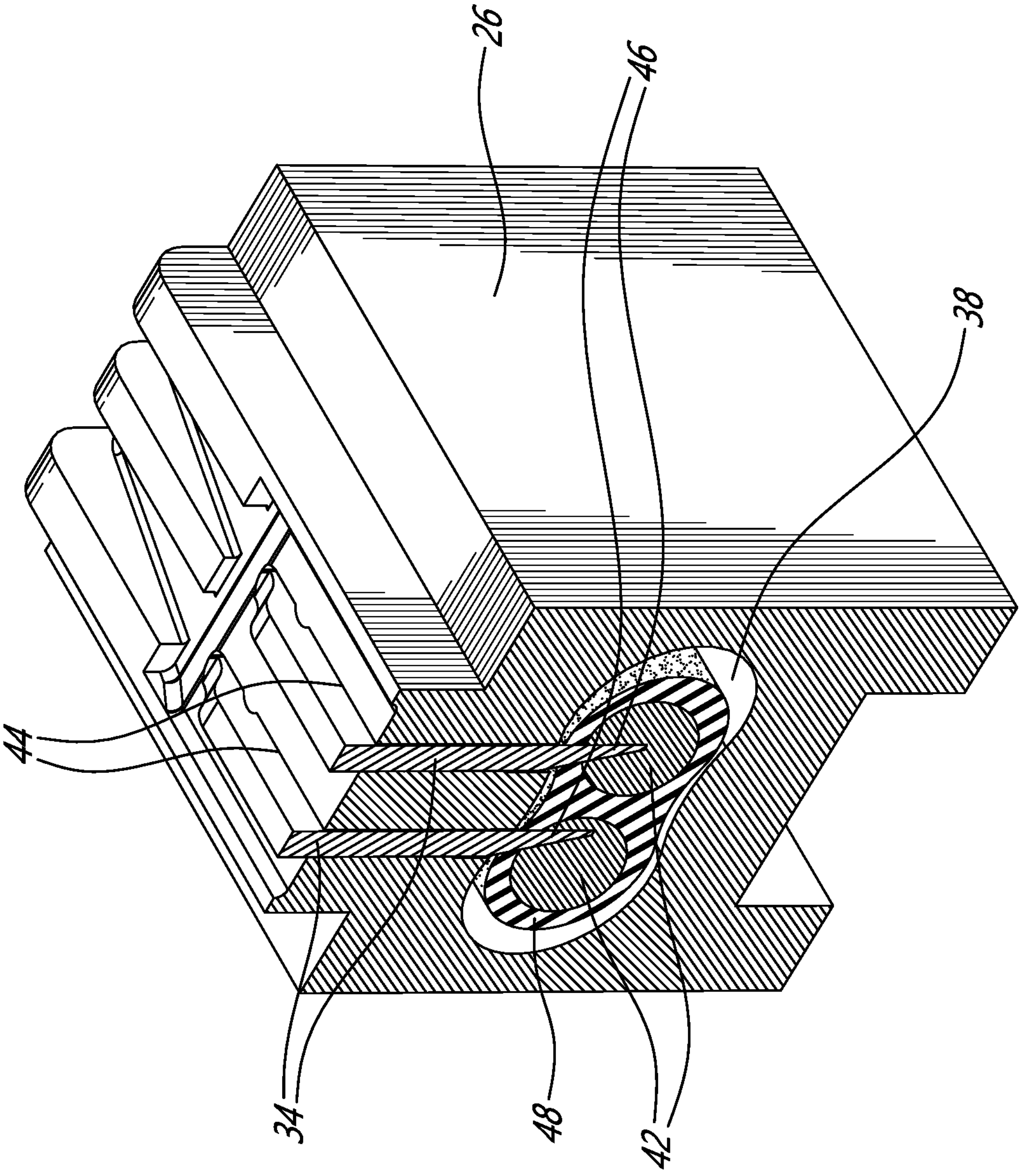
FIG. 2C provides a sectional view along line IIC-IIC in FIG. 2A.

Referring to FIG. 2C in addition to FIGS. 2A and 2B, as the piercing contacts 34 are inserted into their respective slot 44 for example using a suitable tool (not shown) or the like, the tips 46 of the piercing contacts 34 cut the insulation 48 of an aligned one the conductors 42 and such that the conductor 42 is brought into electrical contact with the piercing contact 34. A person of ordinary skill in the at will now understand that other interconnection technologies, such as Insulation Displacement Contacts (IDCs), electroplating using direct laser deposit or a bare contact with pressure such as a screw contact could also be used instead of piercing contacts.

Figure 3A:
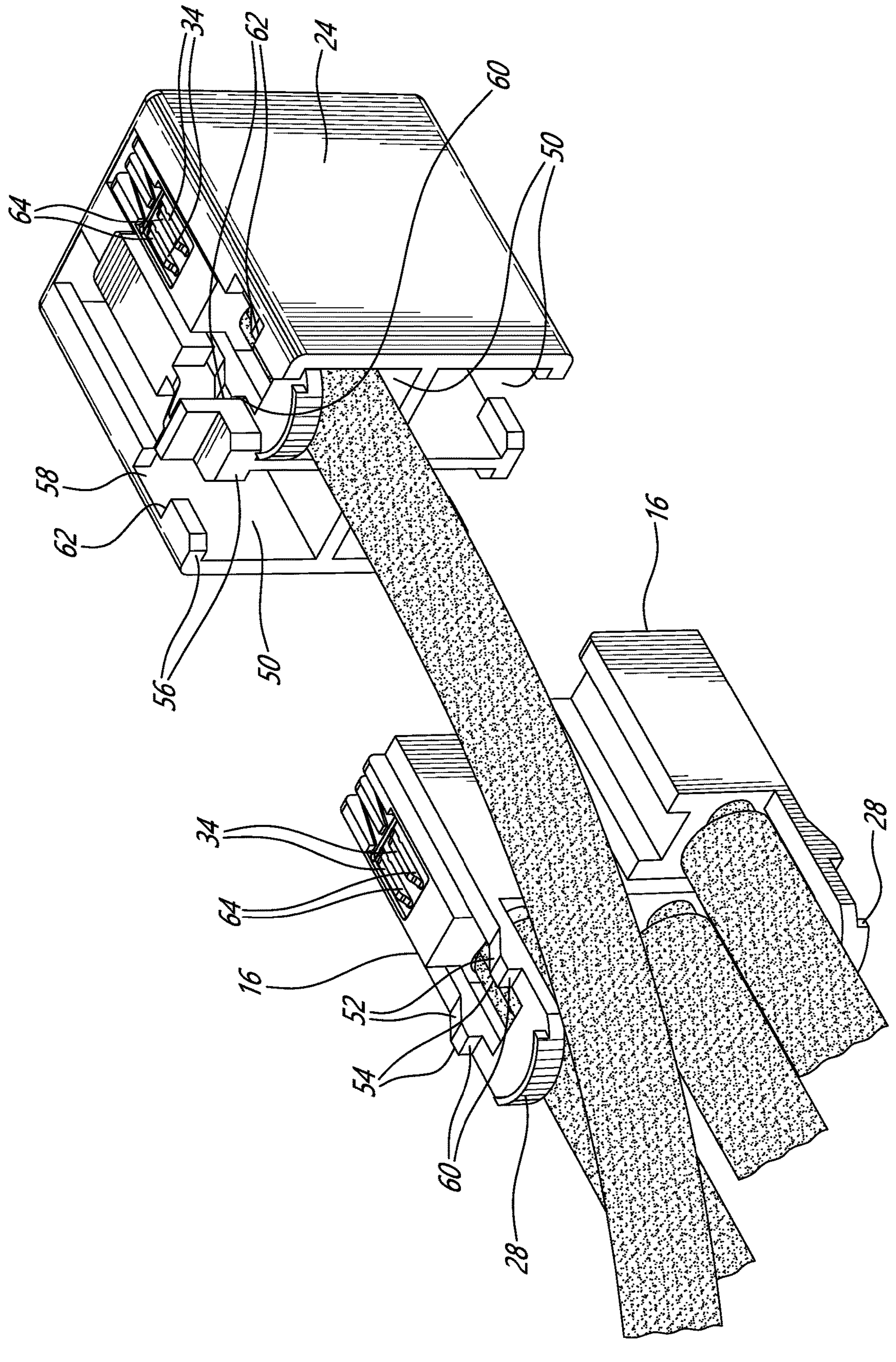
FIG. 3A provides a raised right perspective view of a partially assembled cable assembly in accordance with an illustrative embodiment of the present invention.

Referring now to FIG. 3A, as discussed above, in a particular embodiment multiple cables 12 may be arranged, or ganged, in a 2×2 configuration by inserting the miniplugs 16 into a respective one of a plurality of plug receiving chambers 50 in the caddy 24. Illustratively, a first pair of two miniplugs are inserted with their piercing contacts 34 facing outwards in a first direction and a second pair of two miniplugs 16 are inserted with their piercing contacts 34 facing outwards in a second direction opposite the first direction. In this regard, as each of the miniplugs 16 is inserted into its respective chamber 50, bevelled edges 52 on a pair of tabs 54 on each release lever 28 are engaged by an outward face 56 of the recess, flexing the free end 36 of the release lever 28. As each miniplug 16 is inserted completely into its respective chamber 50, the pair of tabs 54 are biased into a respective cut out 58 in each of the chambers 50 and such that an engaging surface 60 of each of the tabs 54 is arranged positioned opposite an inner face 62 of a respective one of the cut outs 58. A person of ordinary skill in the art will now understand that once inserted into their respective chamber 50, the miniplugs 16 are held securely within the caddy 24. In order to remove a selected one of the miniplugs 16 from the caddy 24, the free end 36 of the release lever 28 is flexed such that the engaging surface 60 of each of the tabs 54 are disengaged from their respective inner faces 62, thereby allowing the miniplug 16 to be retracted from the chamber 50.

Still referring to FIG. 3A, as discussed above, the miniplugs 16 of a first pair of cables 12 are inserted into the caddy 24 in a first orientation with the contact surfaces 64 of the piercing contacts 34 and the elongate release levers 28 facing outwards. The miniplugs 16 of a second pair of cables 12 are inserted into the caddy 24 in a second orientation with both the contact surfaces 64 of the piercing contacts 34 and the elongate release levers 28 facing outwards but wherein the second orientation is opposite that of the first orientation.

Figure 3B:
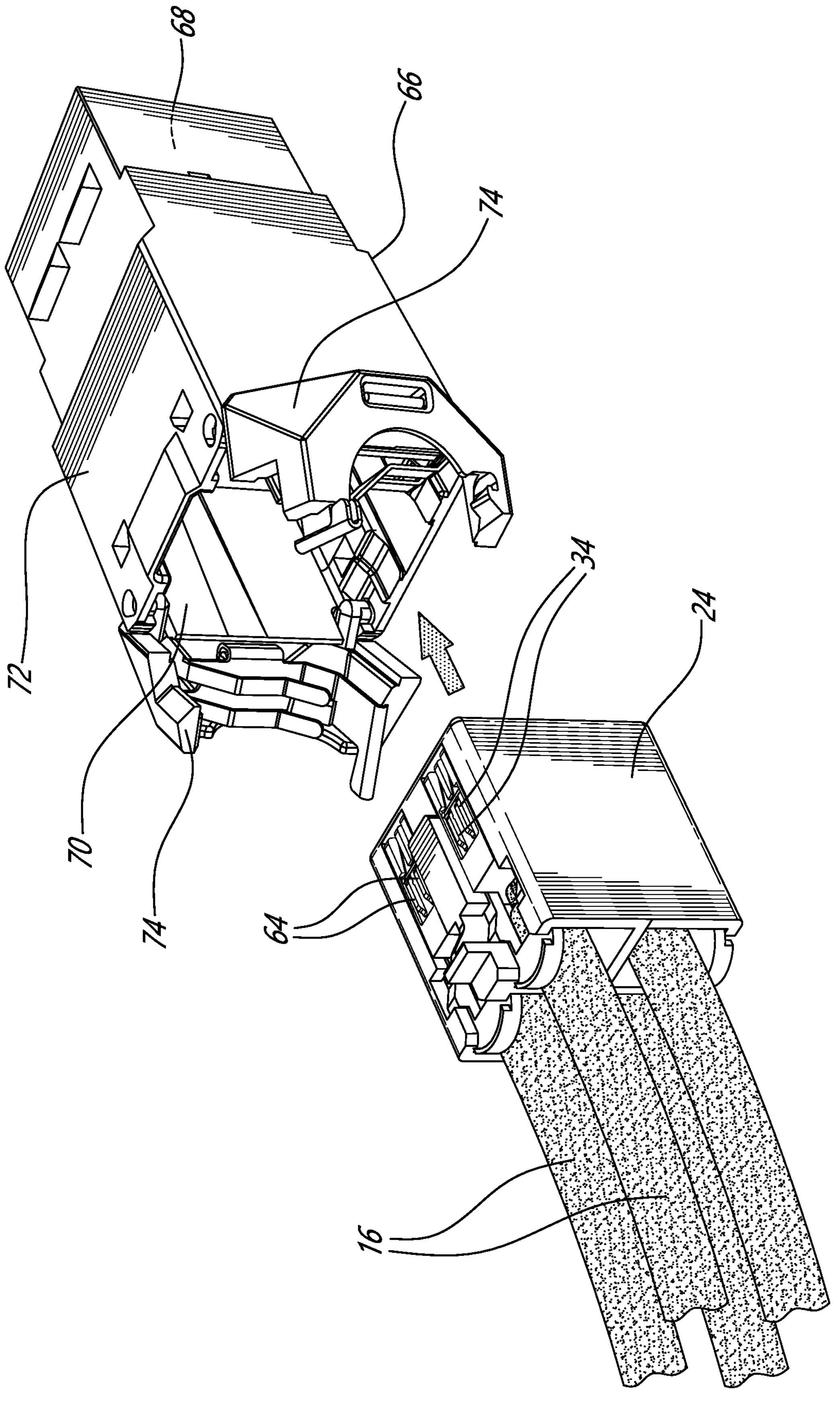
FIG. 3B provides a raised right perspective view of a cable assembly and compatible device in accordance with an illustrative embodiment of the present invention.

Referring now to FIG. 3B in addition to FIG. 3A, once miniplugs 16 of the four (4) cables 12 have been arranged within the caddy 24, the assembly is ready for insertion into a compatible device 66. Illustratively, in a first embodiment a device 66 comprising a RJ-45 type receptacle (not shown) on a front surface 68 is provided. The device 66 further comprises a caddy receiving receptacle 70 on a rear surface, dimensioned to receive the caddy 24/cable 12 assembly.

Still referring to FIG. 3B, as the caddy 24/cable 12 assembly is inserted into the caddy receiving receptacle 70, the contact surfaces 64 of the piercing contacts 34 are interconnected with respective ones of a plurality of conductive members (not shown) arranged within the device housing 72. Illustratively, each of the conductive members is interconnected with a respective one of a plurality of tines arranged within the J-45 receptacle (also not shown). Illustratively, doors 74 or the like are provided on the device housing 72 to secure the caddy 24/cable 12 assembly within the caddy receiving receptacle 70.

Still referring to FIG. 3B, the device housing 72 is illustratively dimensioned to fit in an opening in a compatible patch panel or wall plate (all not shown) such as a keystone type opening.

In an alternative embodiment the device 66 comprises a RJ-45 plug, back-to-back connector or other receptacle dimensioned for receiving a terminated four (4) twisted pair cable (all not shown) such as a REVConnect™ type receptacle or the like. In particular, the back-to-back connector comprises a pair of opposed caddy receiving receptacles 70 for receiving respective ones of a pair of caddy 24/cable 12 assemblies. The back-to-back connector comprises conductive members in the connector housing (both not shown) arranged such that in a first embodiment, when the pair of caddy 24/cable 12 assemblies are inserted into their respective caddy receiving receptacles 70, the contact surfaces 64 of the piercing contacts 34 come into contact with respective ones of the conductive members and such that a piercing contact 34 of a first of the pair of caddy 24/cable 12 assemblies is interconnected with a respective piercing contact 34 of a second of the pair of caddy 24/cable 12 assemblies.

Figure 3C:
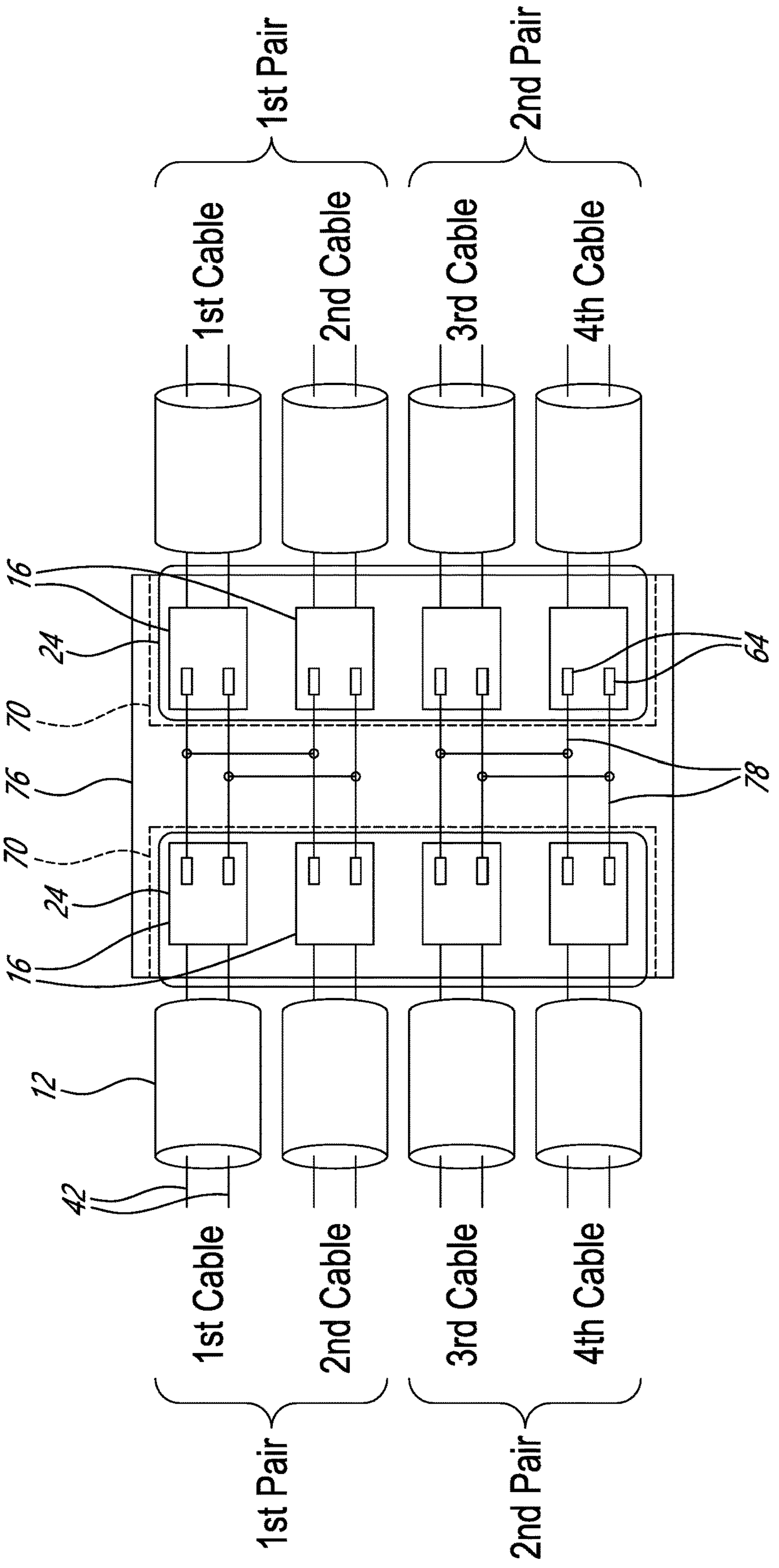
FIG. 3C provides a schematic diagram of a back-to-back connector in accordance with an illustrative embodiment of the present invention.

With reference now to FIG. 3C in addition to FIGS. 3A and 3B, in a second embodiment, when the pair of caddy 24/cable 12 assemblies are inserted into their respective caddy receiving receptacles 70 of a back-to-back connector 76, the contact surfaces 64 of the piercing contacts 34 come into contact with respective ones of the conductive members 78 and such that a piercing contact 34 of each of the miniplugs 16 of a first of the pair of caddy 24/cable 12 assemblies is interconnected with a piercing contact 34 of each of a pair of miniplugs 16 in the second of the pair of caddy 24/cable 12 assemblies. In this manner, the conductors of 42 of a first pair of the cables 12 of the first of the caddy 24/cable 12 assemblies are interconnected with respective ones of the conductors 42 of a first pair of the cables 12 of the second of the caddy 24/cable 12 assemblies. A person of ordinary skill in the art will understand that the conductors 42 of the all the cables can be interconnected by providing suitable jumper cable (not shown) terminated at both ends by a miniplug 16, and arranging the plugs such that the jumper cable is a member of both the first pair and the second pair of cables.

Figure 3D:
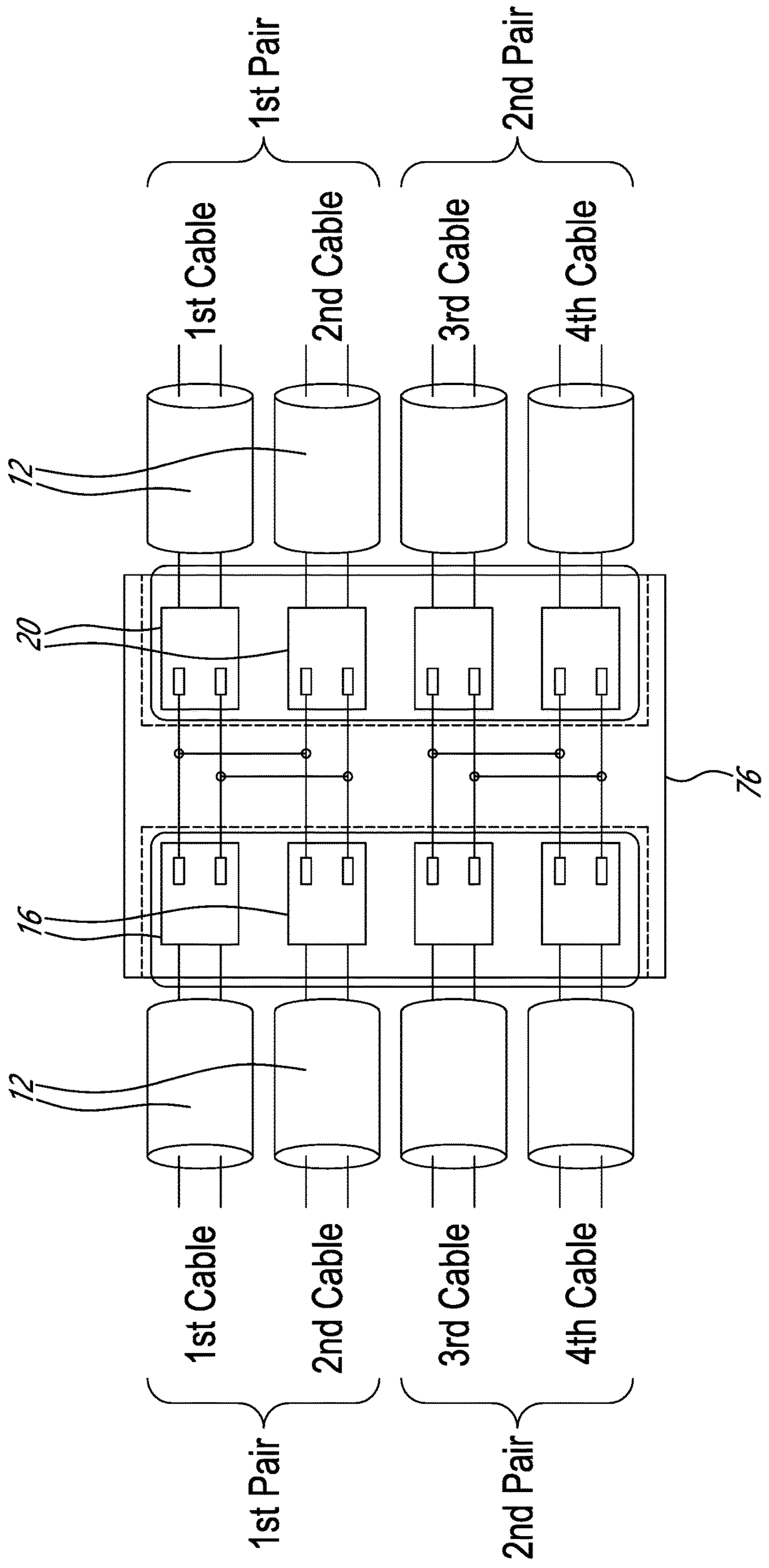
FIG. 3D provides a schematic diagram of a back-to-back connector in accordance with an alternative illustrative embodiment of the present invention.

Referring now to FIG. 3D, in an alternative embodiment the back-to-back connector 76 can be configured to receive a first plurality of four (4) cables 12 each terminated by a miniplug 16 on a first side of the back-to-back connector 76 and a second plurality of four (4) cables 12 each terminated by a second standardised plug 20.

Figure 4A:
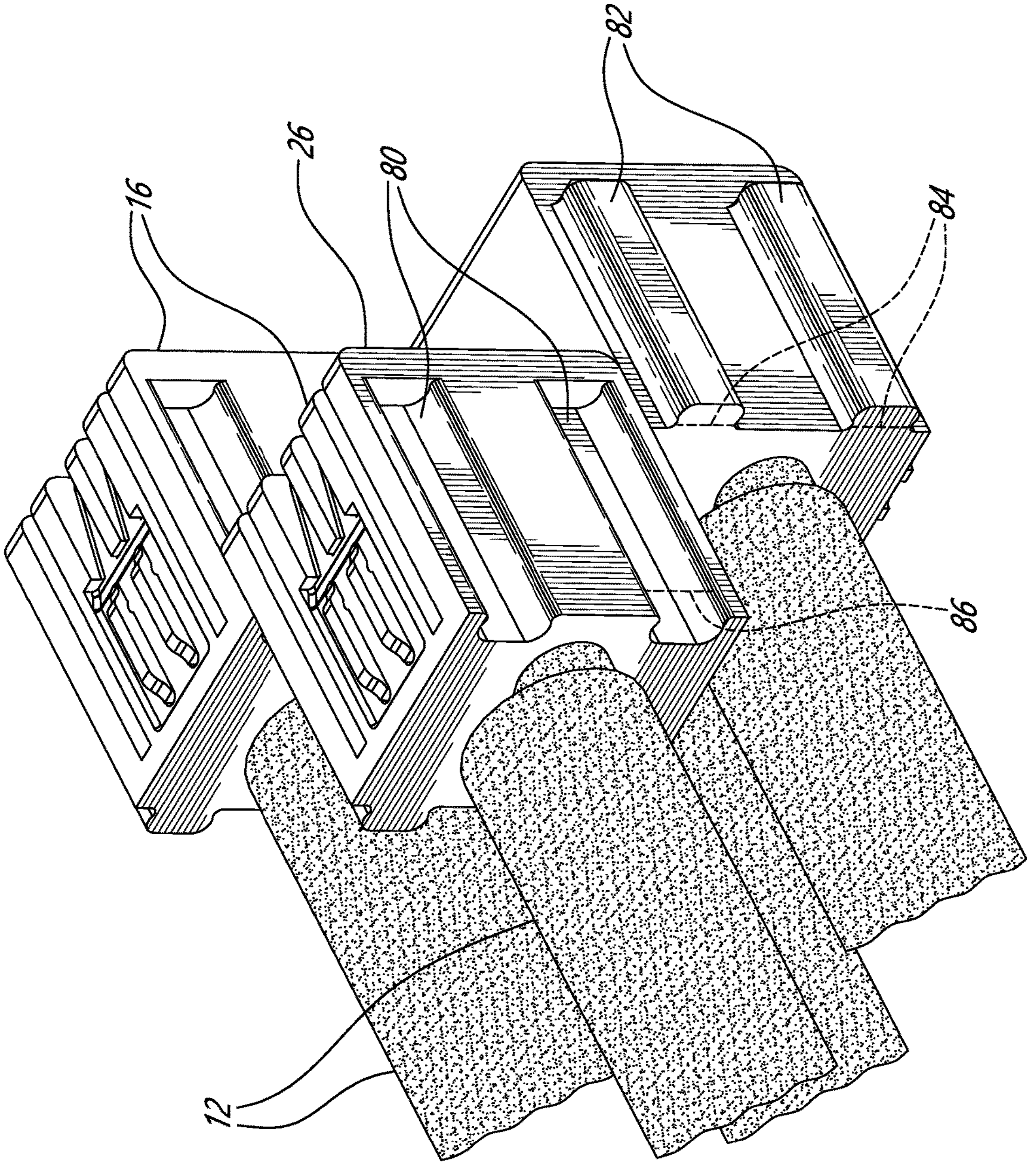
FIG. 4A provides a raised right perspective view of a partially assembled cable assembly in accordance with an alternative illustrative embodiment of the present invention.
Figure 4B:
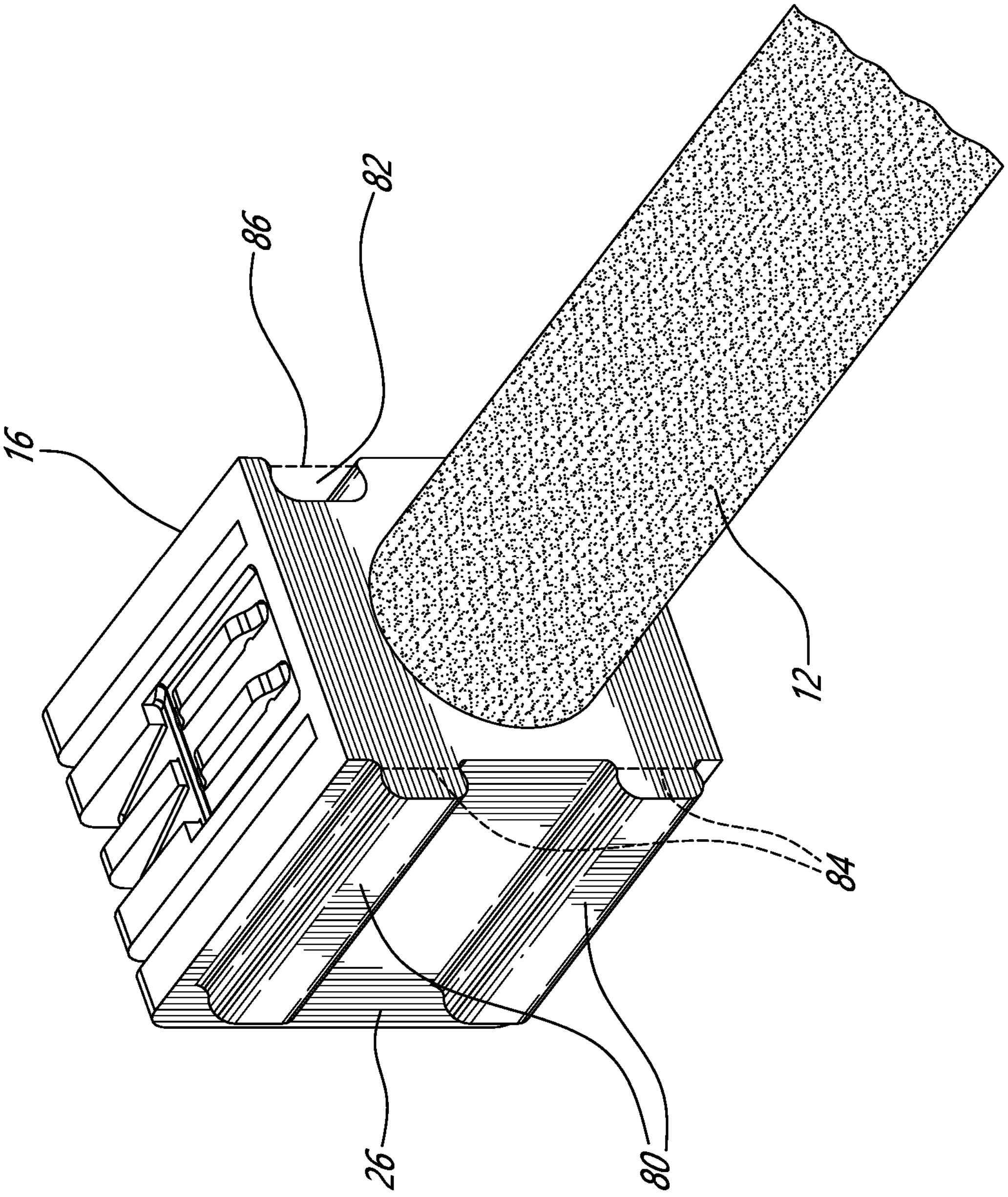
FIG. 4B provides a raised left reversed perspective view of a cable and connector plug in accordance with an alternative illustrative embodiment of the present invention.

Referring now to FIGS. 4A and 4B, in an alternative embodiment each connector housing 26 is molded with complementary one or more positive interlocking features 80, such as on or more rods arranged lengthwise along a surface of the connector housing 26, and one or more negative interlocking features 82, such as one or more grooves each dimensioned to receive a respective rod, and such that each miniplug 16 may be interlocked with adjacent miniplugs 16 and such that a caddy is not required. In order to assemble a cable 12 with an adjacent cable 12, the rods 80 of a first of the miniplugs 16 are aligned with the grooves 82 of a second of the miniplugs 16 and the rods 80 slid into the grooves 82. A neck 84 of each of the rods 80 is held within a mouth 86 of one of the grooves 82 and such that the first of the miniplugs 16 cannot be pulled away from the second of the miniplugs 16.

Figure 5A:
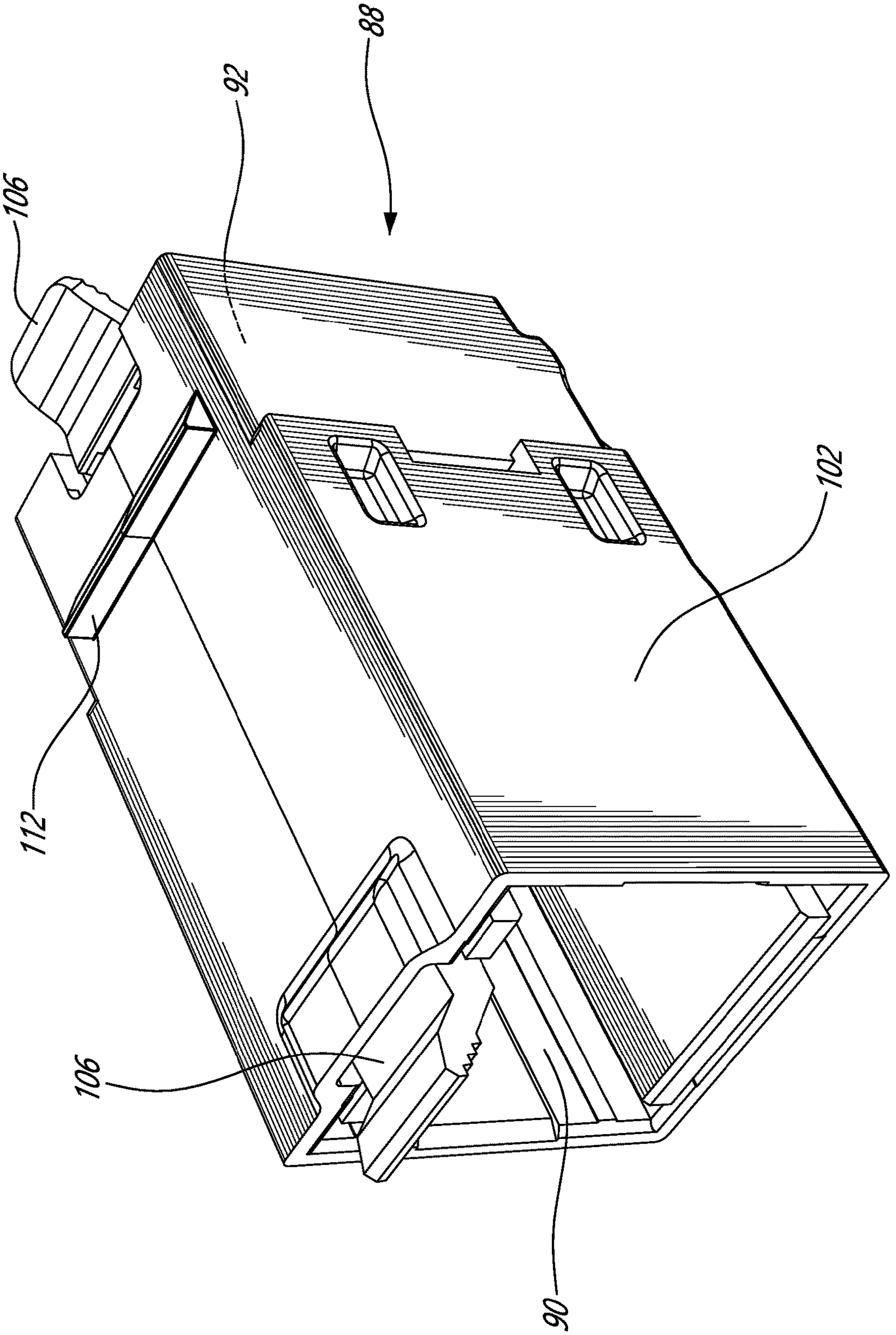
FIG. 5A provides a raised right perspective view of a back-to-back connector cable in accordance with an illustrative embodiment of the present invention.
Figure 5B:
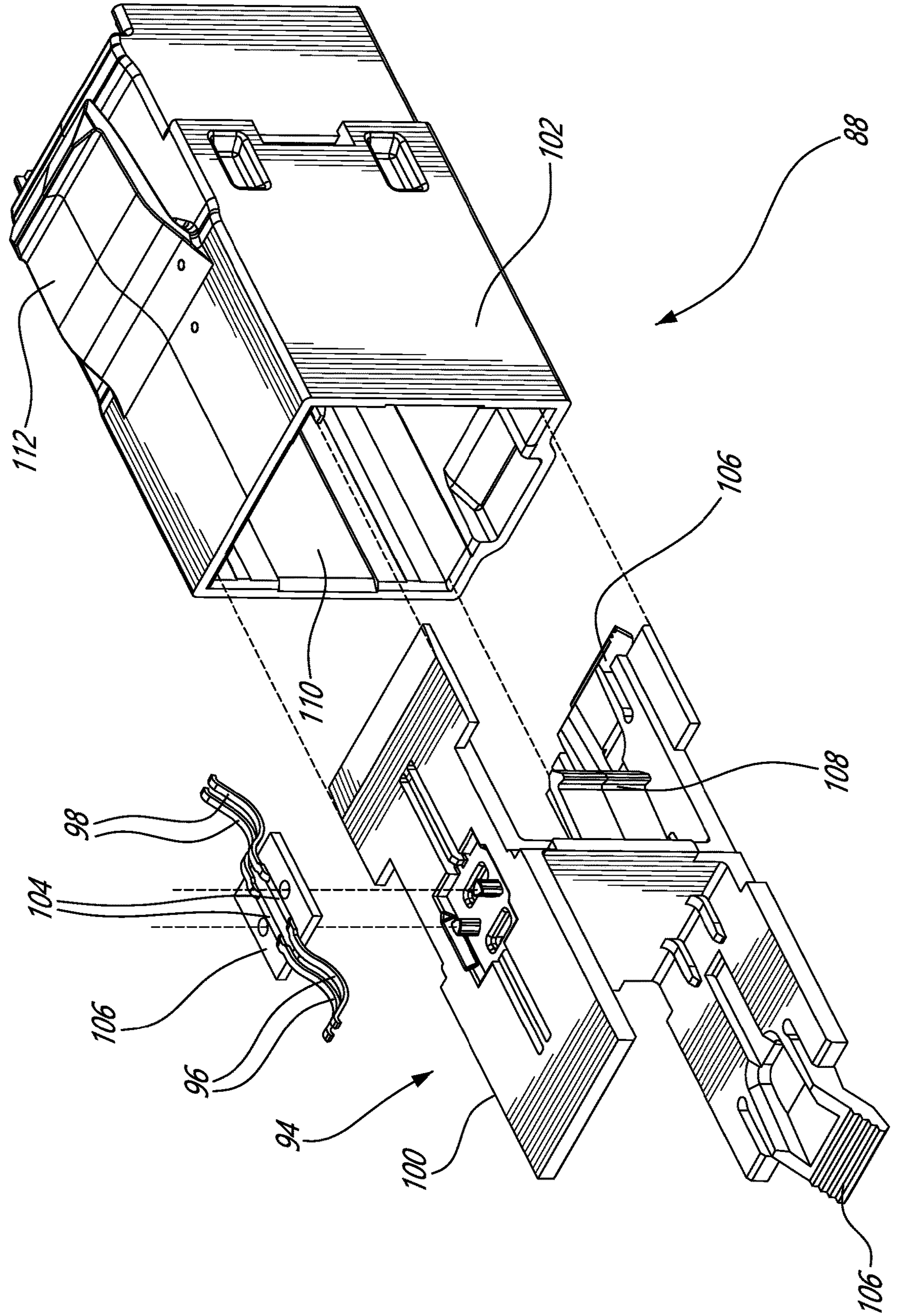
FIG. 5B provides a raised right exploded perspective view of a back-to-back connector cable in accordance with an illustrative embodiment of the present invention.

Referring back to FIG. 2A and to FIG. 5A, in order to interconnect individual cables 12 terminated by a miniplug 16, a back-to-back connector 88 is provided. The back-to-back connector 88 comprises a first receptacle 90 and a second receptacle 92 opposite the first receptacle 90 each dimensioned for receiving one of the miniplugs 16. Referring to FIG. 5B, a subassembly 94 comprising a first pair of conductive members 96 and a second pair of conductive members 98 is provided which are assembled to a frame 100 which is dimensioned to be received within a housing 102 of the back-to-back connector 88. Each conductor of the first pair of conductors 96 is connected with a respective one of the second pair of conductors 98 by a conductive trace 104 on a PC Board 106 or the like such that when the miniplugs 16 are inserted into their respective receptacles 90, 92 each of the piercing contacts 34 of a first of the miniplugs 16 are interconnected with respective ones of the piercing contacts 34 of a second of the miniplugs 16 and such that their respective conductors 42 are interconnected. Each receptacle 90, 92 comprises a releasable latch mechanism 106 via which the miniplugs 16 are retained in their respective receptacles 90, 92. Additionally, the subassembly 94 comprises features 108 which engage with an inner surface 110 of the housing 102 and such that the subassembly 94 is held snugly within the housing 102.

Still referring to FIG. 5B, the housing 102 of the back-to-back connector 88 can be dimensioned to fit in a standardised space such as provided a keystone plate or panel or the like (not shown). In this regard, features 112 may also be provided such that the housing 88 engages with the plate or panel.

Figure 5C:
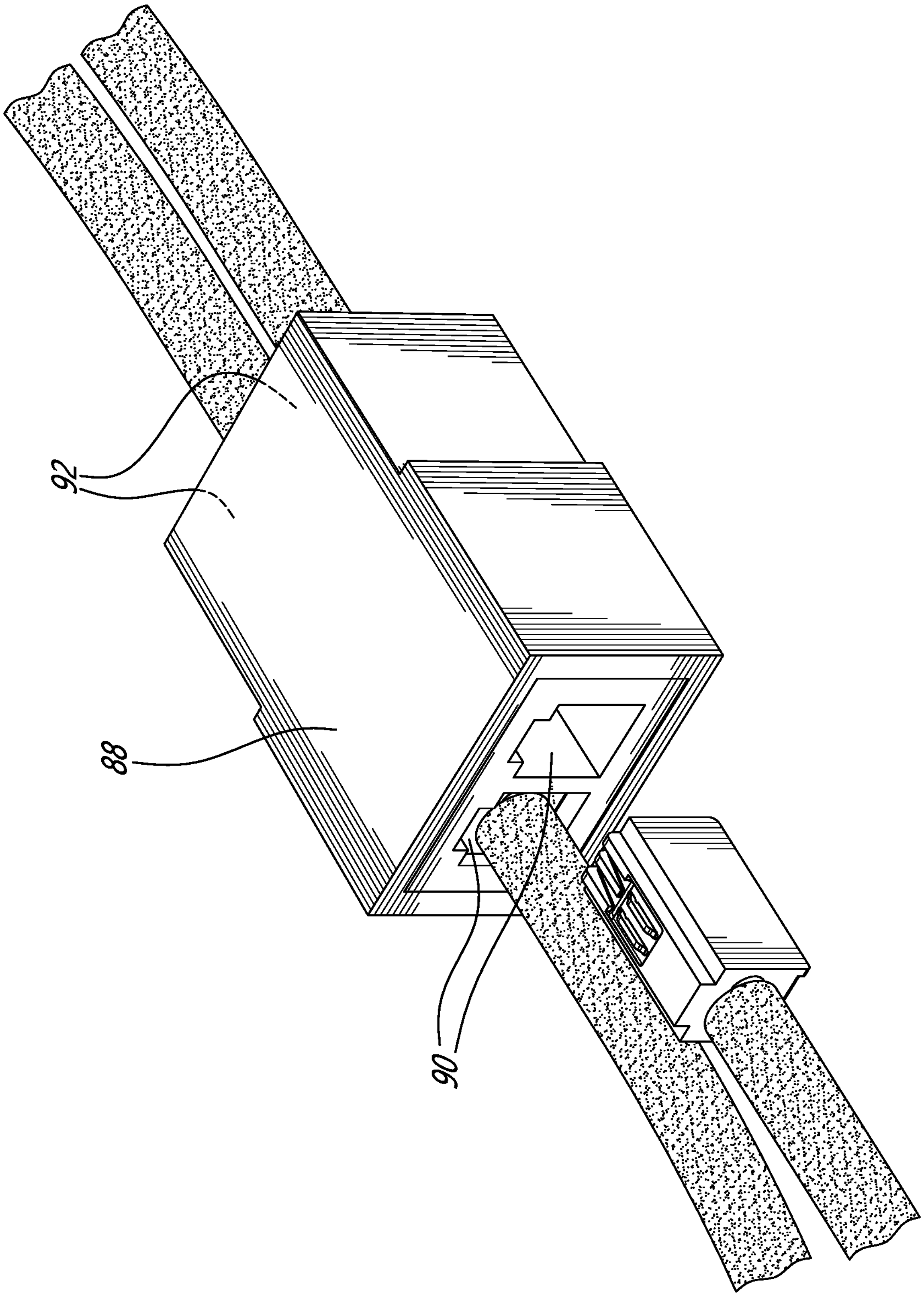
FIG. 5C provides a raised right perspective view of a coupler in in accordance with an illustrative embodiment of the present invention.

Referring to FIG. 5C in addition to 5A, in an alternative embodiment the back-to-back connector 88 can be expanded to provide for a plurality of first receptacles 90 second receptacles 92 opposite the first receptacles 90, each dimensioned for receiving one of the miniplugs 16.

Referring back to FIG. 2A and to FIGS. 5A and 5B, in an alternative embodiment, the back-to-back connector 88 comprises a first receptacle 90 dimensioned for receiving one of the miniplugs 16 and a second receptacle 92 dimensioned for receiving a standardised plug 20. In this regard, a person of ordinary skill in the art will understand that manner in which the interconnection is formed between the miniplug 16 and the standardised plug 20 will vary depending on the type of standardised plug 20.

Figure 6A:
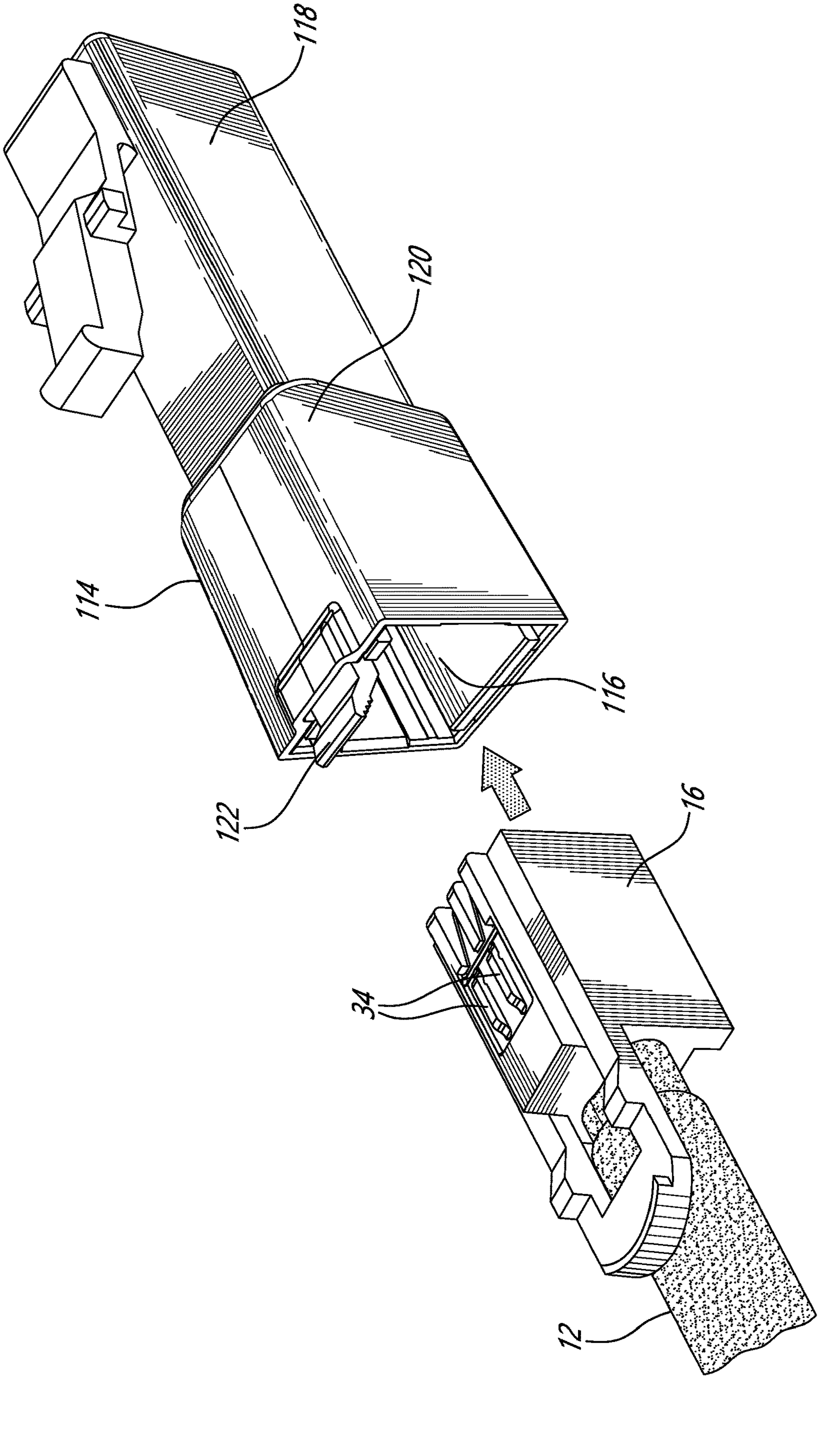
FIG. 6A provides a raised right exploded perspective view of a single cable assembly and a media convertor in accordance with an illustrative embodiment of the present invention.

Referring now to FIG. 6A, in a particular embodiment a media adaptor 114 is provided and such that a cable 12 terminated by a single one of the miniplugs 16 may be converted to a standardised plug such as one conforming to one of the plurality of IEC-63171 standards. The adaptor 114 comprises a first receptacle 116 dimensioned to receive one of the miniplugs 16 and a standardised plug 118 opposite the first receptacle 116. Conductive members (not shown) are provided in a housing 120 of the adaptor 114 such that when the miniplug 16 is inserted into the first receptacle 116, the piercing contacts 34 of the miniplug 16 are interconnected with respective ones of the terminal contacts (not shown) of the standardised plug 118. The receptacle 116 comprises a releasable latch mechanism 122 via which the miniplug 16 is retained within the first receptacle 116. In a particular embodiment, a set of adaptors 114 can be provided, each conforming to a different one of the plurality of IEC-63171 standards.

Figure 6B:
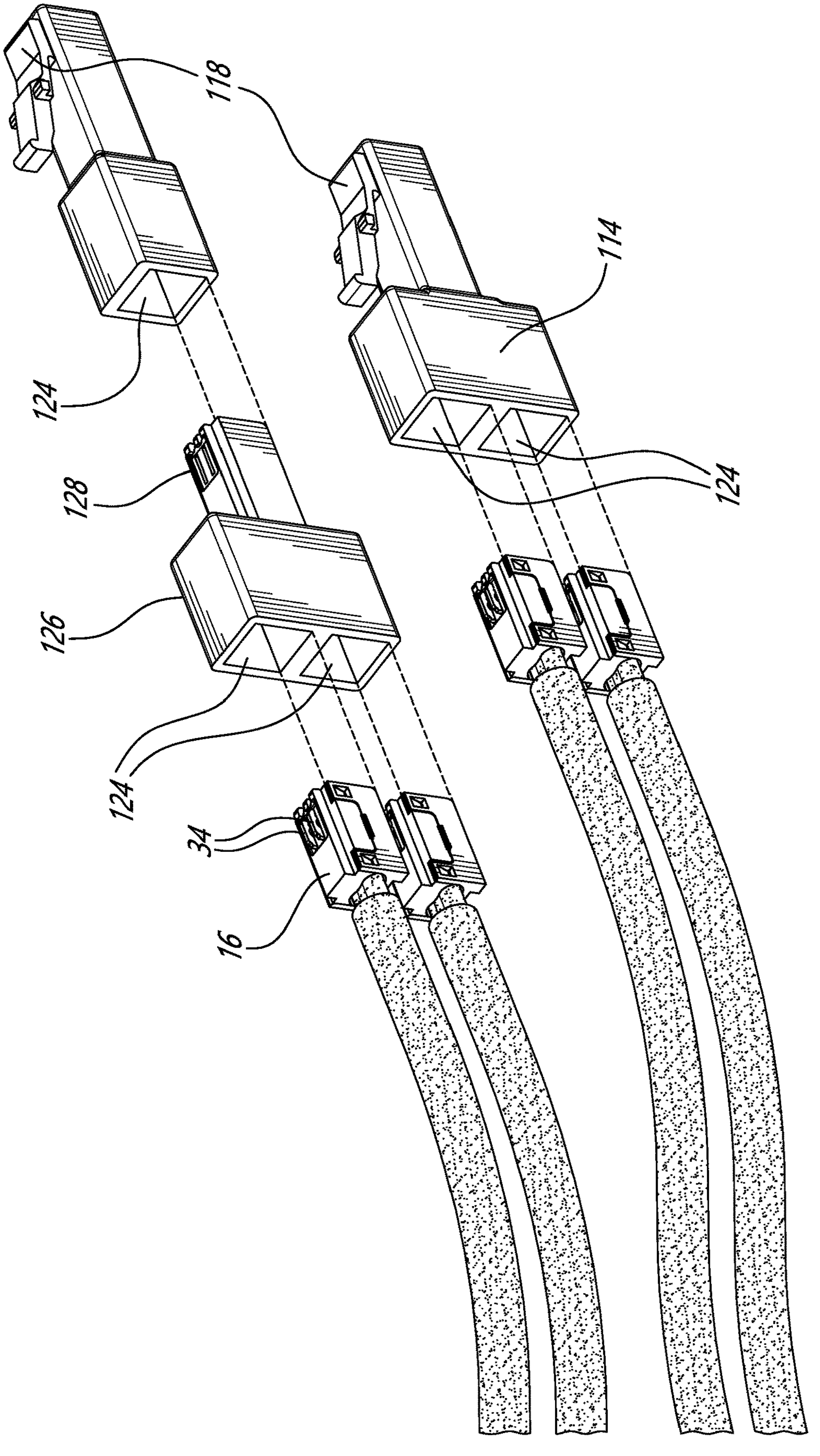
FIG. 6B provides a raised right exploded perspective views of an adaptor in accordance with an illustrative embodiment of the present invention.

Referring to FIG. 6B, in an alternative embodiment the adaptor 114 can be provided with two or more receptacles 124, each dimensioned to receive a respective one of miniplugs 16, and a standardised plug 118 opposite the receptacles 124. In this regard, as the miniplugs 16 are inserted into their respective receptacles 124, each of the contacts 34 comes into contact with respective ones of the contacts (not shown) disposed in the receptacle 124 which are in turn all interconnected with their respective terminal contacts (also not shown) of the standardised plug 118.

Still referring to FIG. 6B, in a particular embodiment the adaptor 114 can be manufactured in two parts. The first part 126 comprises two or more receptacles 124 at a first end and a miniplug plug formed in a second end 128 opposite the receptacles 124. The second part comprises a receptacle 124 dimensioned to receive the miniplug plug formed in a second end 128 and a standardised plug 118 opposite the receptacle 124. As the miniplugs 16 are inserted into their respective receptacles 124, each of the contacts 34 comes into contact with respective ones of the contacts (not shown) disposed in the receptacles 124 which are in turn all interconnected with their respective terminal contacts (also not shown) of the standardised plug 118 via the miniplug plug formed in a second end 128.

Figure 7:
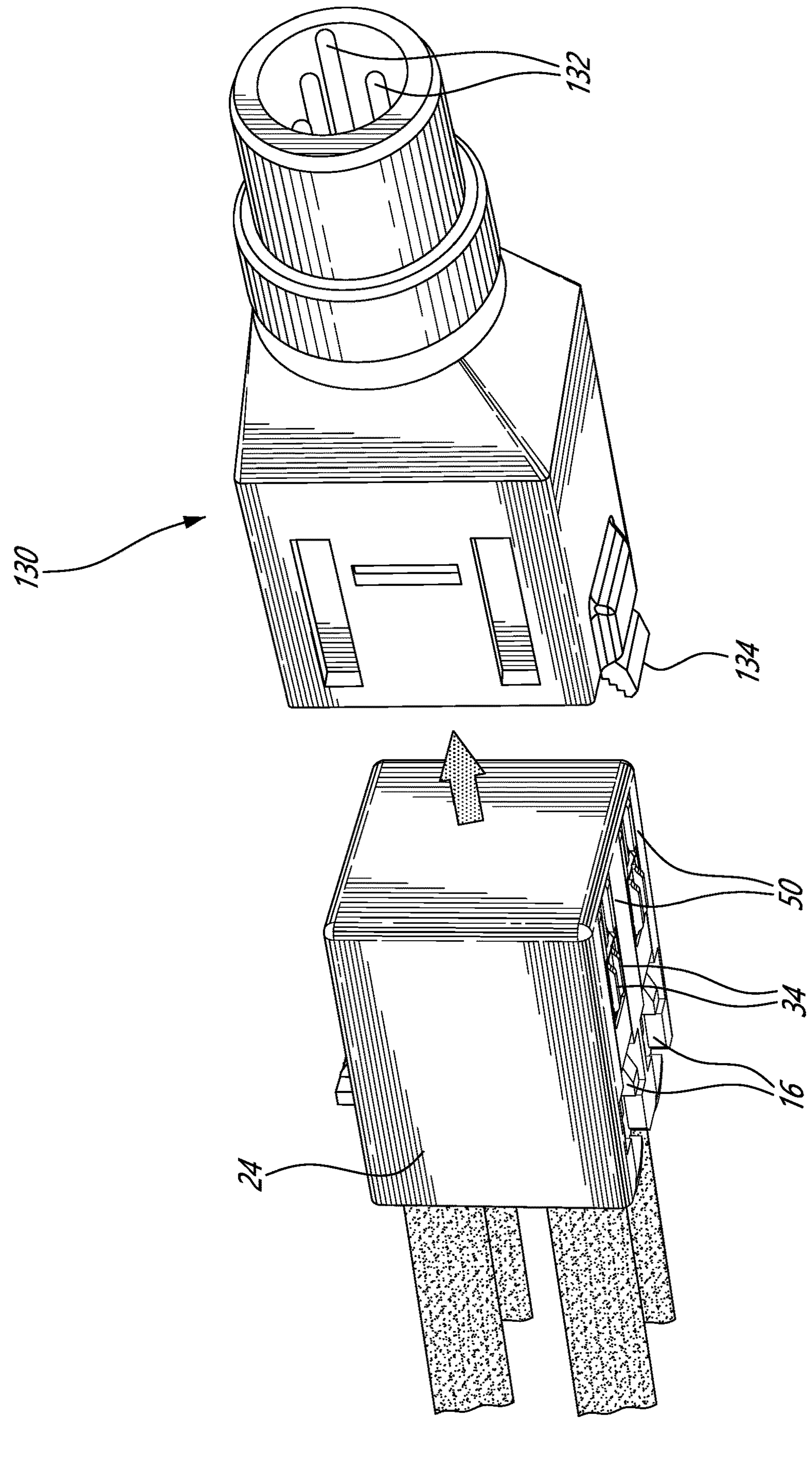
FIG. 7 provides a lowered left perspective view of a multiple cable assembly and a media convertor in accordance with an illustrative embodiment of the present invention.

Referring now to FIG. 7, in an additional embodiment, a media convertor 130, such for engaging with an M12 compatible socket (not shown) is dimensioned to receive plurality of miniplugs 16, for example as shown arranged in respective ones of a plurality of plug receiving recesses 50 in a caddy 24. In this regard, contacts (not shown) are provided on an inner surface of the convertor 130 which, when assembled to a plurality of plugs 16, interconnect each of the piercing contacts 34 with respective ones of a plurality of terminal contacts 132. A latch mechanism 134 is provided for releasably securing the caddy 24 within the convertor 130.

Figure 8:
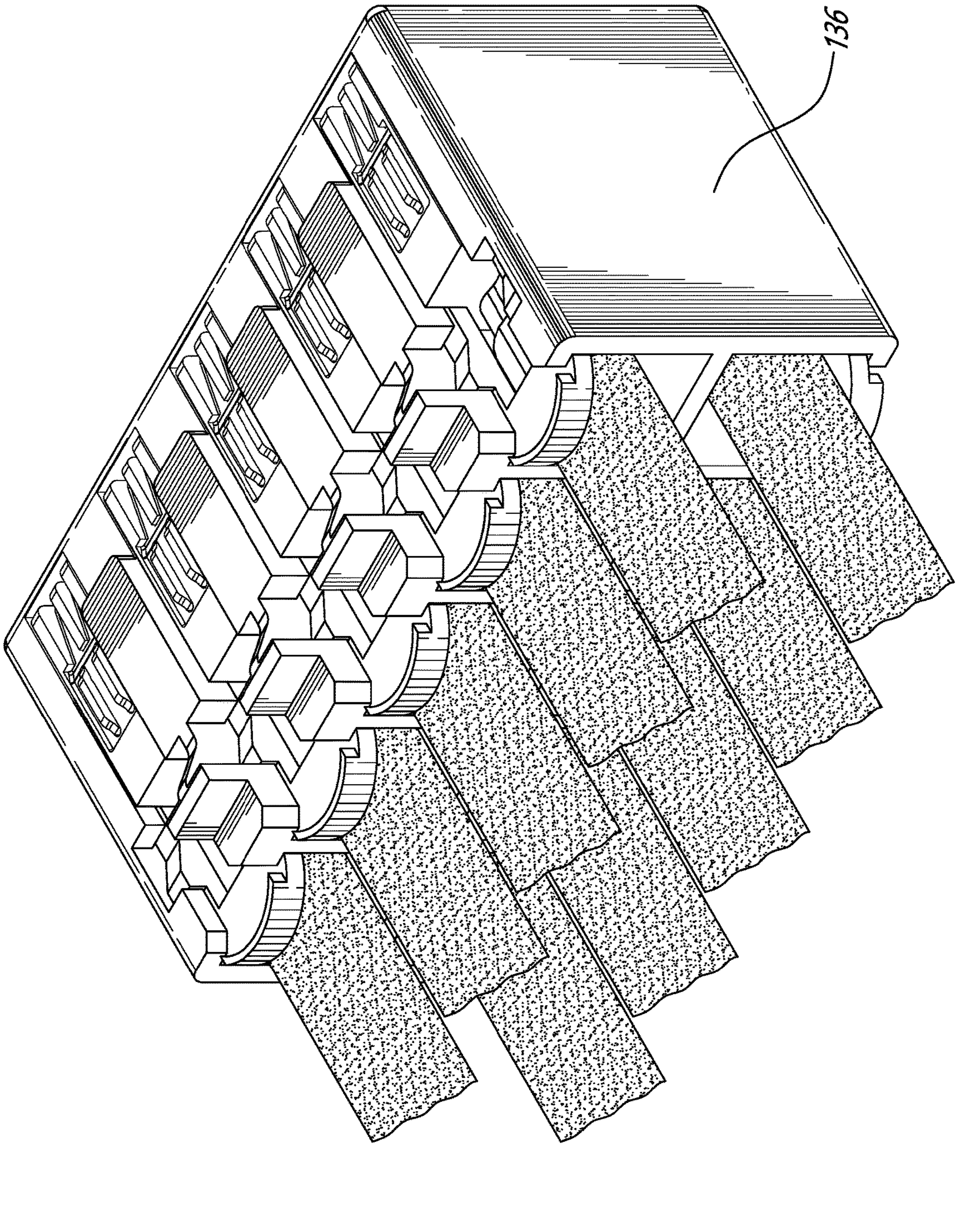
FIG. 8 comprises a raised right perspective view of a multiple cable assembly in accordance with another illustrative embodiment of the present invention.
Figure 8:
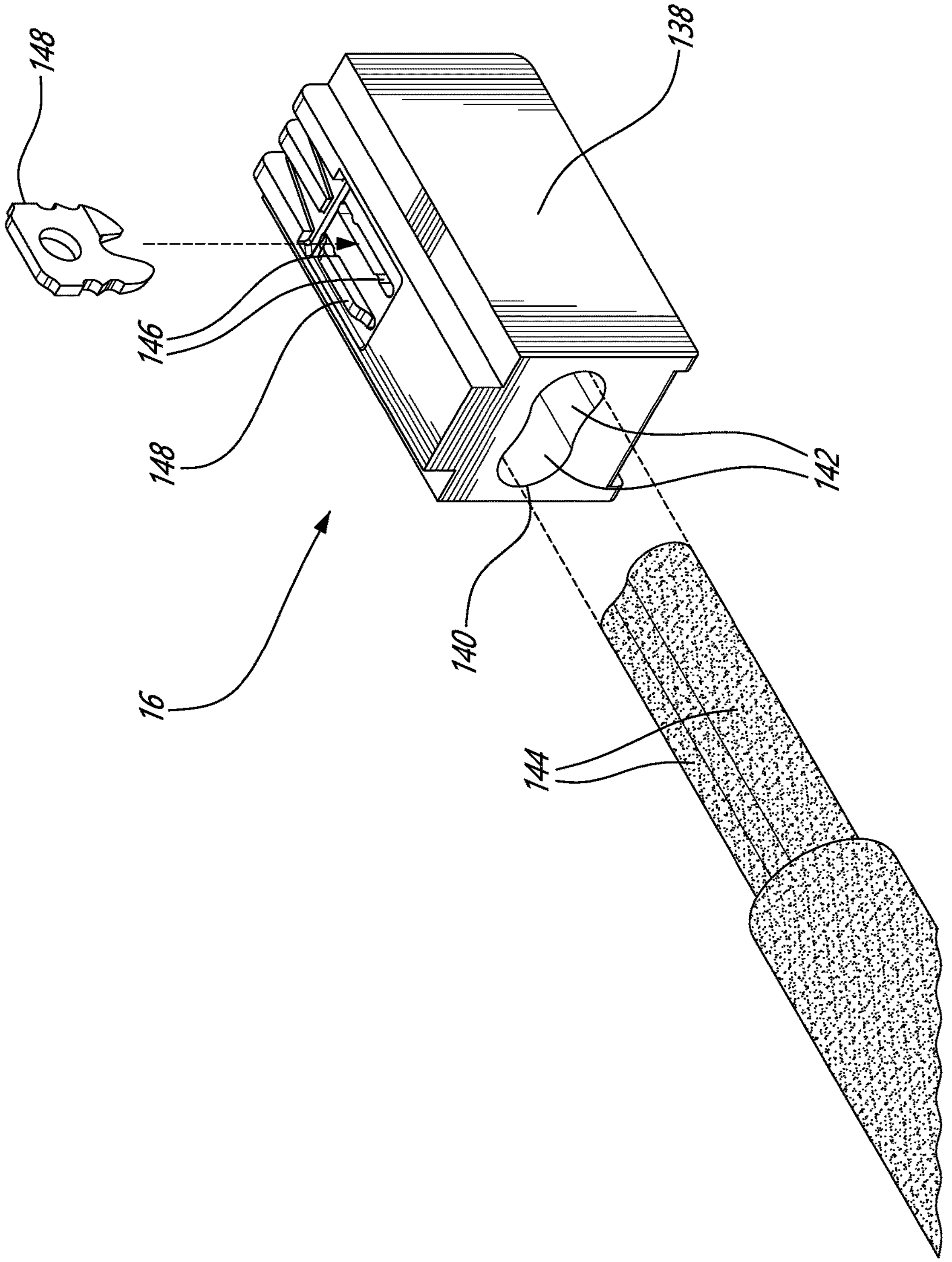

Referring now to FIG. 8, in a further embodiment, multiple cables 12 and miniplugs 16 are arranged together, for example using a caddy 136 or the like, and such that a smaller number (e.g. 2) or a larger number of single pairs of conductors can be simultaneously terminated at a given device (not shown). For example, the miniplugs 16 terminated in this manner can be received in a suitable configured wall plate, patch panel or other device (all not shown). Alternatively, the device could be configured to receive multiple caddies 136, for example arranged side by side.

Referring now to FIG. 9, in a first alternative embodiment each miniplug 16 is comprised of a housing 138 comprising a passageway 140 comprising a pair of elongate passages 142 illustratively interconnected along a length thereof. Each passage 142 is dimensioned to receive one of a pair of insulated conductors 144. In a particular embodiment the pair of insulated conductors 144 are bonded together. A pair of slots 146 are provided, one slot intersecting a respective one of the passages 142. Each slot is dimensioned to receive one of a pair of piercing contacts 148 which on assembly interconnect with respective ones of the conductors 144. As will be understood now by a person of ordinary skill in the part, the miniplug 16 is assembled by inserting the conductors 144 into respective ones of the passages 142 and driving the pair of piercing contacts 148 via their respective slots 146 into their respective conductor 144, typically using a tool (not shown) designed for the purpose.

Figure 10B:
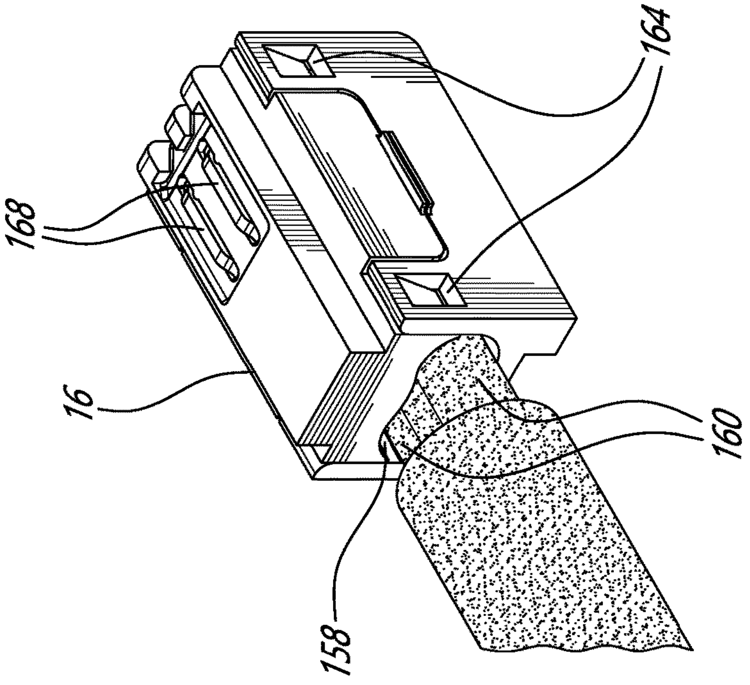
FIG. 10A provides a right exploded perspective view of a cable and miniplug assembly in accordance with a second alternative embodiment of a miniplug of the present invention FIG. 10B provides a raised right perspective view of a cable and miniplug assembly in accordance with a second alternative embodiment of a miniplug of the present invention.
FIG. 10C provides a lowered right perspective view of a miniplug in accordance with a second alternative embodiment of a miniplug of the present invention.
FIG. 10D provides a raised perspective view of a a belt of miniplugs in accordance with a second alternative embodiment of a miniplug of the present invention.
Figure 10A:
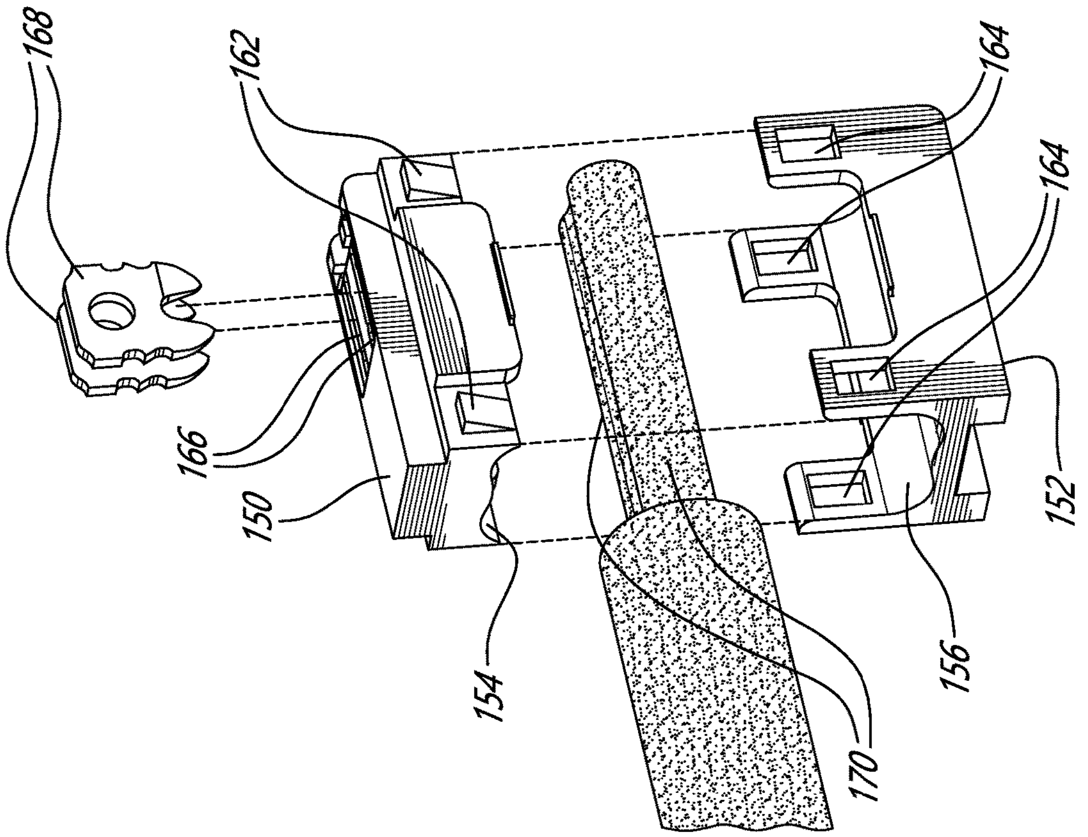

Referring now to FIGS. 10A and 10B, in a second alternative embodiment each miniplug 16 comprises a first housing part 150 and a second housing part 152 each comprising a profiled inner surface 154, 156 which when assembled define a passageway 158 illustratively comprising a pair of interconnected passages 160. The first housing part 150 and the second housing part 152 are held together by a mechanical interlock between four tabs 162 in the first housing part 150 which interlock with four complementary slots 164 in the second housing part 152. A pair of slots 166 are provided, one slot intersecting a respective one of the passages 160. Each slot is dimensioned to receive one of a pair of piercing contacts 168 which on assembly interconnect with respective ones of the conductors 170. As will be understood now by a person of ordinary skill in the part, the miniplug 16 is assembled by snapping the first housing part 150 and the second housing part 152 about the conductors 166 and such that the tabs 162 interlock with respective ones of the slots 164. In this regard, the piercing contacts 168 can be preinstalled in their respective slots 166 such that assembly of the first housing part 150 to the second housing part 152 drives the piercing contacts 168 into the conductors 170 held therebetween.

Figure 10D:
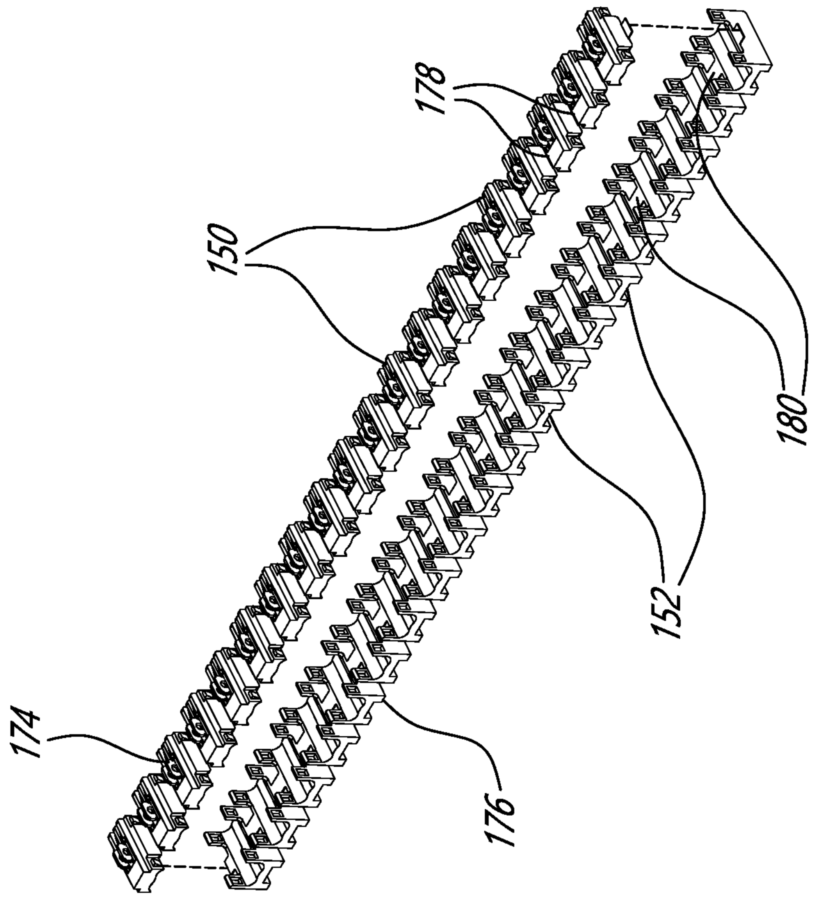
Figure 10C:
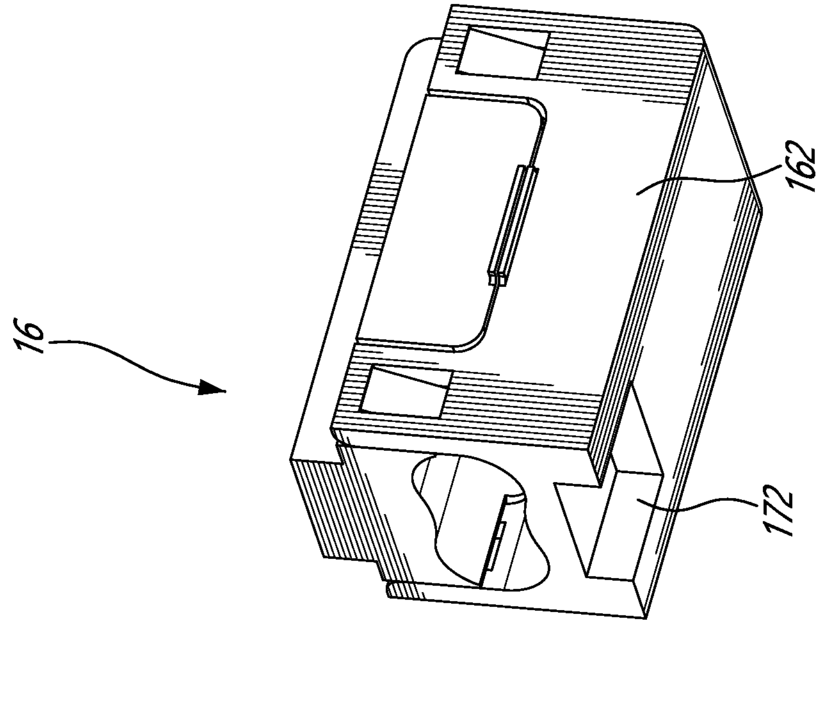

Referring to FIG. 10C in addition to FIGS. 10A and 10B, the second housing part 152 illustratively includes a slot 172 moulded therein for, as will be discussed in more detail below, engaging with a retaining mechanism (not shown).

Referring to FIG. 10D, in a particular embodiment, the first housing part 150 and the second housing part 152 can be fabricated as chains or belts 174, 176 of parts, for example for automated assembly using a machine not shown) or the like. In this regard, each first housing part 150 is attached to at least one adjacent first housing part 150 by a flap 178. Similarly, each second housing part 152 is attached to at least one adjacent second housing part 152 by a flap 180. The flaps 178, 180 are removed during assembly.

Figure 11A:
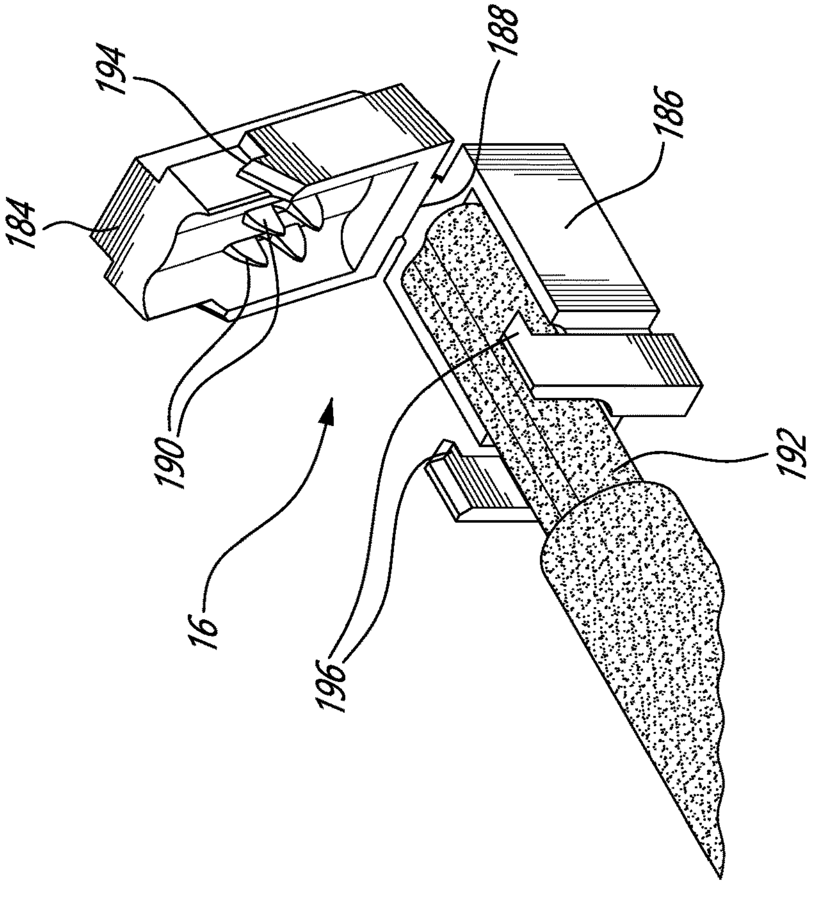
FIG. 11A provides a right exploded perspective view of a cable and miniplug assembly in accordance with a third alternative embodiment of a miniplug of the present invention FIG. 11B provides a lowered right perspective view of a cable and miniplug assembly in accordance with a third alternative embodiment of a miniplug of the present invention.
Figure 11B:
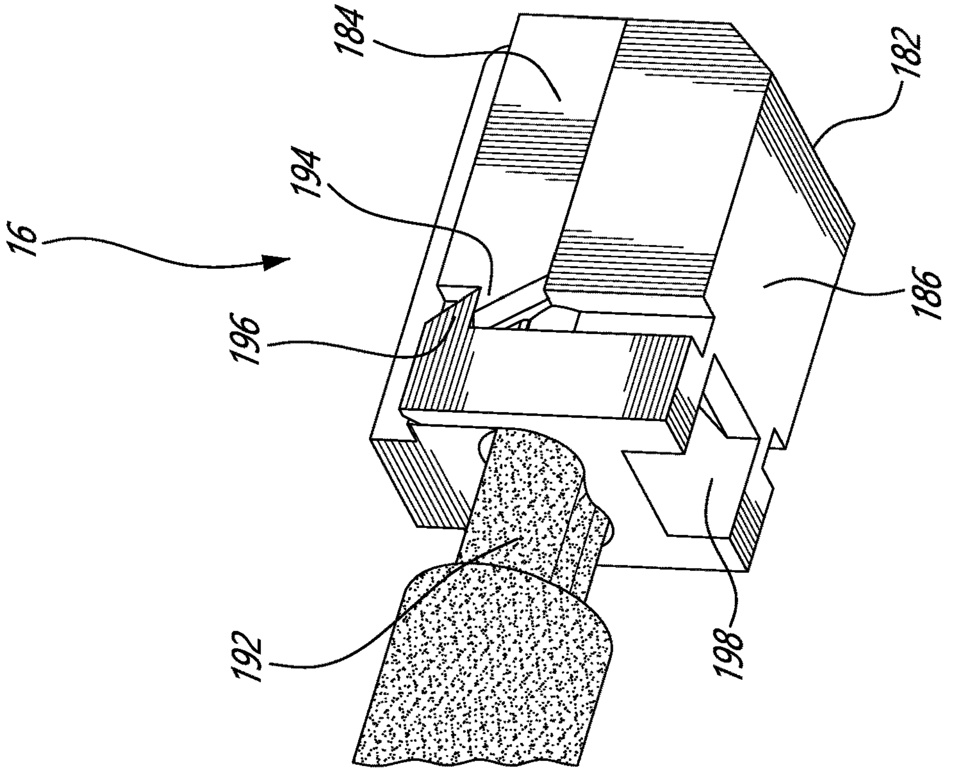

Referring now to FIG. 11A, in a third alternative embodiment each miniplug 16 comprises a housing 182 comprising a first housing part 184 and a second housing part 186 interconnected by a hinge 188. A pair of piercing contacts 190 are illustratively preassembly to the first housing part 184 such that the miniplug 16 may be ready assembled to the ends of a pair of conductors 192 by placing the conductors 192 in the second housing part 186 and pressing the housing parts 184, 186 together. The first housing part 184 further comprises features 194 which engage with complementary features 196 on the second housing part 186 thereby securing the first housing part 184 to the second housing part 186. Referring to FIG. 11B, in a particular embodiment the second housing part 186 illustratively includes a slot 198 moulded therein for, as will be discussed in more detail below, engaging with a retaining mechanism (not shown).

Figure 12A:
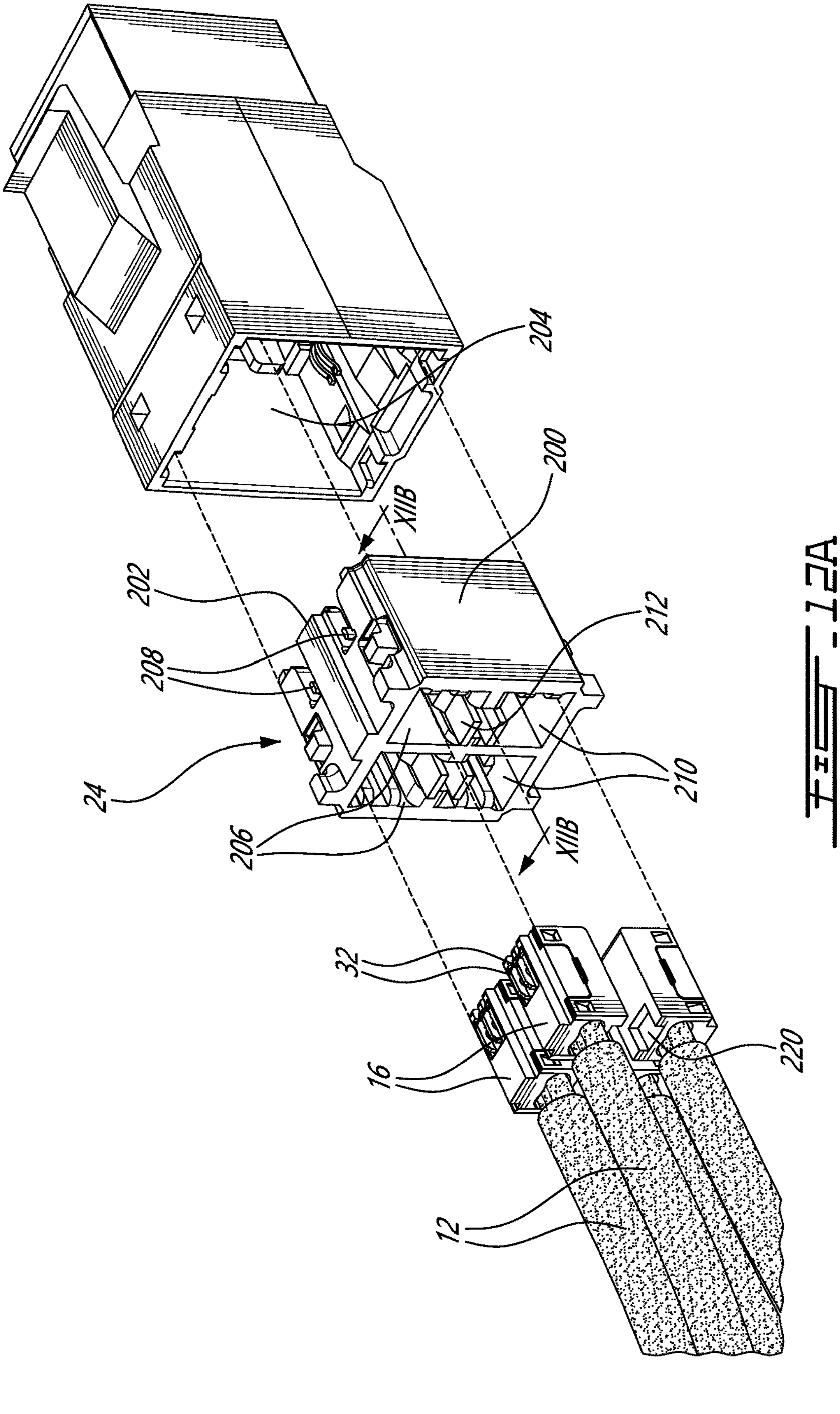
FIG. 12A provides a right exploded perspective view of a cable, caddy and socket assembly in accordance with a first alternative embodiment of a caddy of the present invention.

Referring now to FIG. 12A, in a first alternative embodiment, the caddy 24 comprises an outer surface 200 comprising a first end 202 dimensioned for insertion into a socket 204. The caddy 24 further comprises four chambers 206 in a 2×2 arrangement. Each chamber 206 is dimensioned to receive a respective one of a plurality of miniplugs 16, each miniplug 16 terminating a respective SPE cable 12. An aperture 208 is provided between each chamber and the outer surface 200 of the caddy 24. The apertures 208 align with the pairs of contacts 34 of inserted ones of the miniplugs 16 and such that the contacts 34 are exposed on the outer surface 200. Each chamber 206 comprises a mouth 210 via which a miniplug 16 can be inserted into the chamber 206 and a retaining mechanism.

Figure 12B:
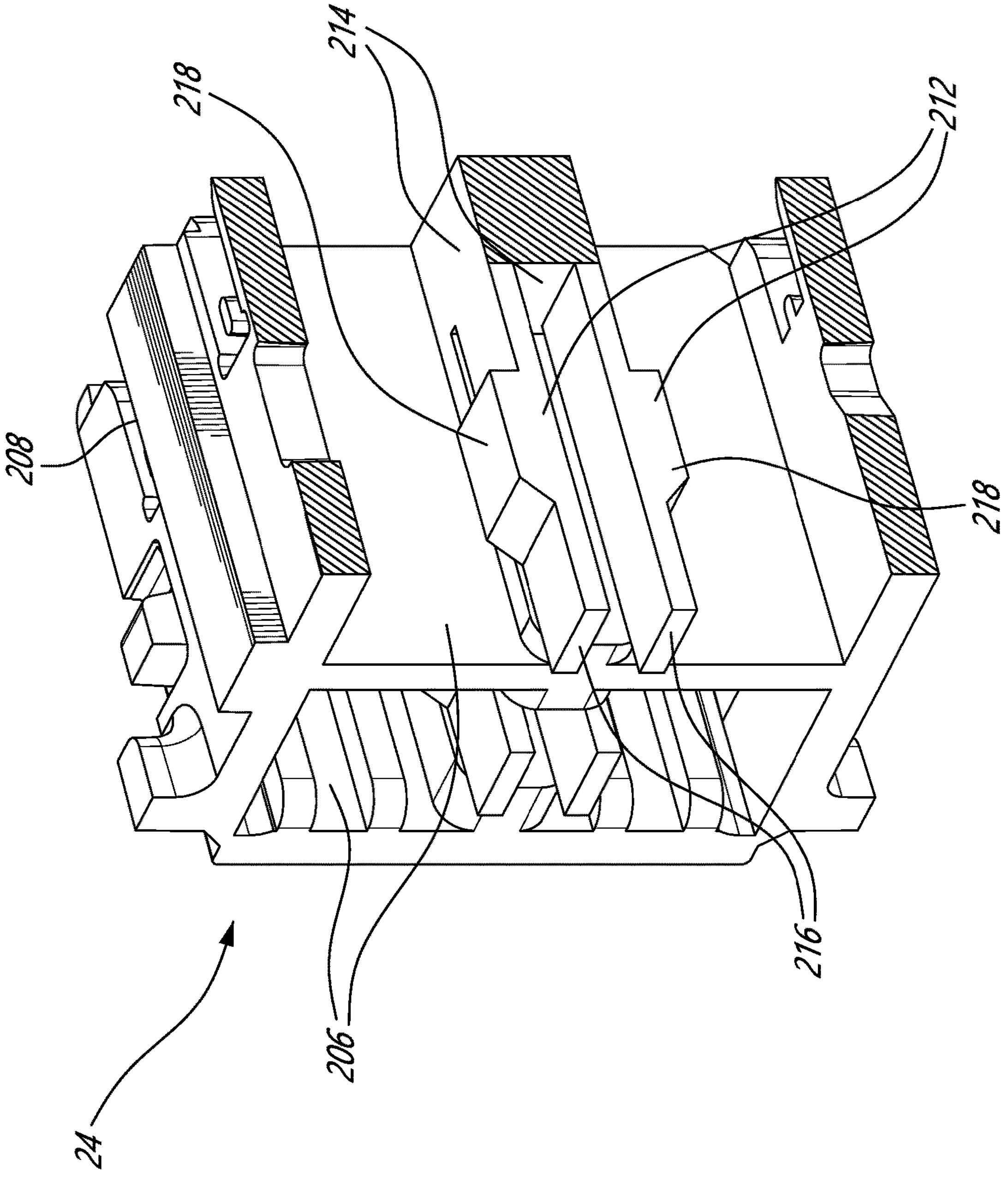
FIG. 12B provides a sectional view along line XIIB-XIIB in FIG. 12A.

Referring to FIG. 12B in addition to FIG. 12A, the retaining mechanism comprises a lever 212 associated with each chamber 206 and comprising a fixed end 214 secured to the caddy 24 and a flexible end 216 extending out of the chamber 206. The flexible end 216 comprises a tab 218 which engages with a complementary recess 220 in the miniplug 16. As the miniplug 16 is inserted into the chamber 206 via the chamber mouth 210, a forward bevelled edge 222 of the tab 218 is engaged by the miniplug 16 thereby flexing the flexible end 216 and moving the tab 218 out of the path of the miniplug 16. When the miniplug 16 is fully inserted into the chamber 206, the tab 218 is biased into the complementary recess 220 by the flexing of the flexible end 216 thereby securing the miniplug 16 in the chamber 206. A person of ordinary skill in the art will now understand that a miniplug 16 can be removed from its respective chamber 206 by flexing the flexible end 216 such that the tab 218 is moved out of the recess 220 and while pulling the SPE cable 12 attached to the miniplug 16.

Figure 13A:
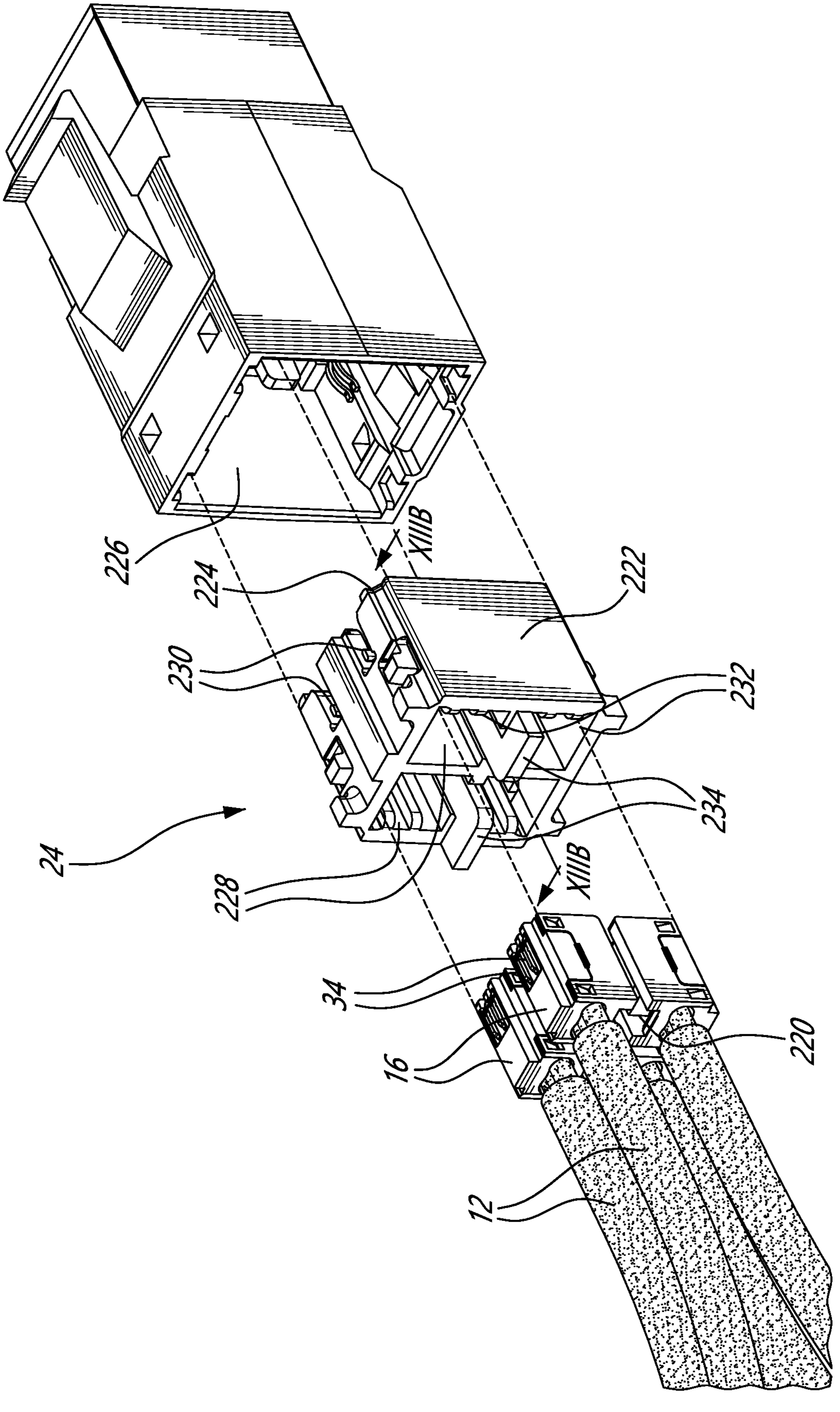
FIG. 13A provides a right exploded perspective view of a cable, caddy and socket assembly in accordance with a second alternative embodiment of a caddy of the present invention.

Referring now to FIG. 13A, in a second alternative embodiment, the caddy 24 comprises an outer surface 222 comprising a first end 224 dimensioned for insertion into a socket 226. The caddy 24 further comprises four chambers 228 in a 2×2 arrangement. Each chamber 228 is dimensioned to receive a respective one of a plurality of miniplugs 16, each miniplug 16 terminating a respective SPE cable 12. An aperture 230 is provided between each chamber and the outer surface 222 of the caddy 24. The apertures 230 align with the pairs of contacts 34 of inserted ones of the miniplugs 16 and such that the contacts 34 are exposed on the outer surface 222. Each chamber 228 comprises a mouth 232 via which a miniplug 16 can be inserted into the chamber 228 and a retaining mechanism.

Figure 13B:
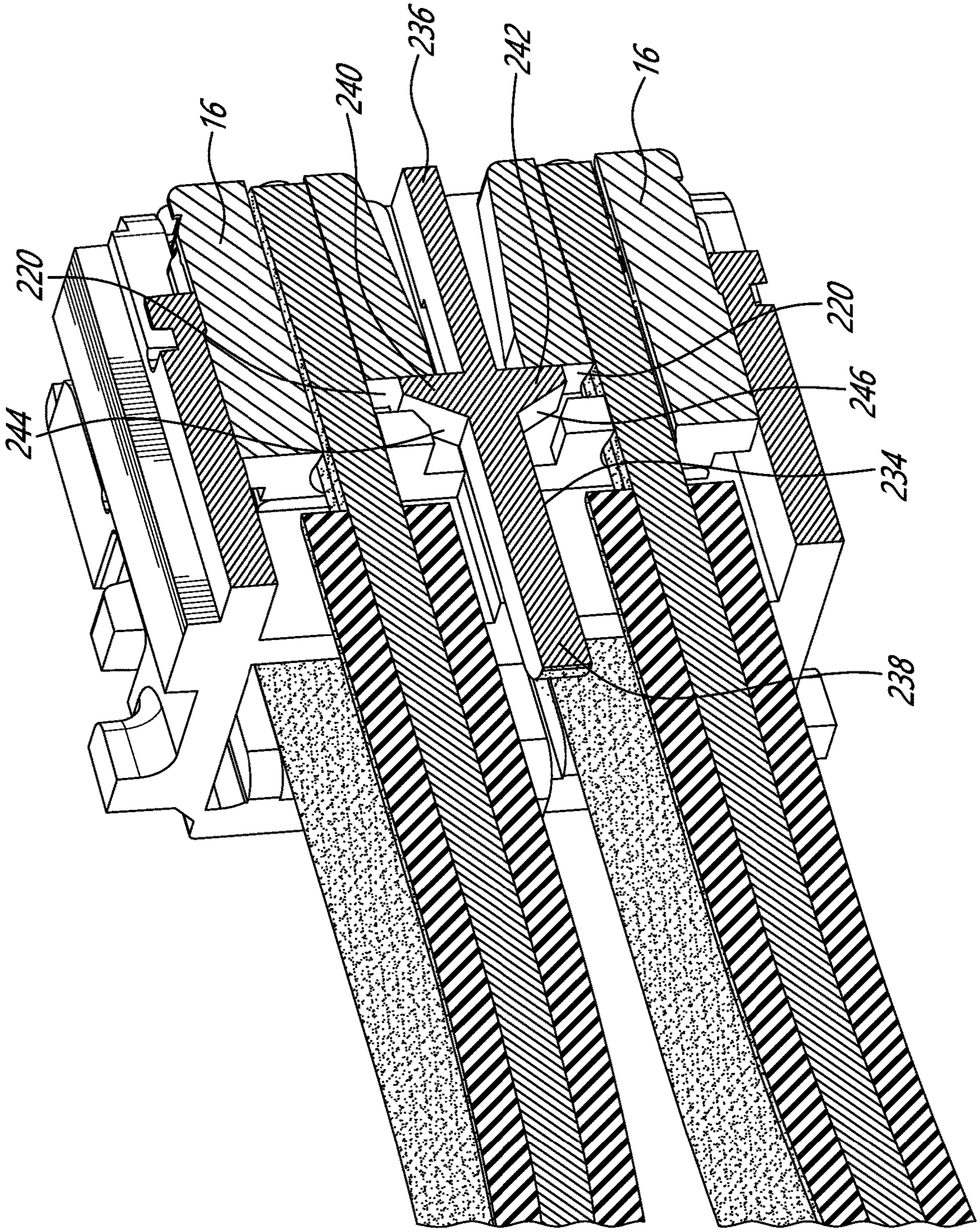
FIG. 13B provides a sectional view along line XIIIB-XIIIB in FIG. 13A.

Referring to FIG. 13B in addition to FIG. 13A, the retaining mechanism comprises a dual-action lever 234 associated with each pair of chambers 228 and comprising a fixed end 236 secured to the caddy 24 and a flexible end 238 extending out of the chamber 228. The flexible end 238 comprises an upper tab 240 which engages with the complementary recess 220 in an upper one of the miniplugs 16 and a lower tab 242 which engages with the complementary recess 220 in a lower one of the miniplugs 16. As the upper miniplug 16 is inserted into the upper chamber 228 via the chamber mouth 222, a forward bevelled edge 244 of the upper tab 240 is engaged by the miniplug 16 thereby flexing the flexible end 238 and moving the upper tab 240 out of the path of the miniplug 16. When the miniplug 16 is fully inserted into the upper chamber 228, the upper tab 240 is biased into the complementary recess 220 by the flexing of the flexible end 238 thereby securing the miniplug 16 in the upper chamber 228. Similarly, as the lower miniplug 16 is inserted into the lower chamber 228 via the chamber mouth 222, a forward bevelled edge 246 of the lower tab 242 is engaged by the miniplug 16 thereby flexing the flexible end 238 and moving the lower tab 242 out of the path of the miniplug 16. When the miniplug 16 is fully inserted into the lower chamber 228, the lower tab 242 is biased into the complementary recess 220 by the flexing of the flexible end 238 thereby securing the miniplug 16 in the lower chamber 228. A person of ordinary skill in the art will now understand that a miniplug 16 can be removed from its respective upper or lower chamber 228 by flexing the flexible end 238 of the dual-action lever 234 such that either the upper tab 240 or the lower tab 242 is moved out of their respective recess 220 and while pulling the SPE cable 12 attached to the miniplug 16.

Figure 14A:
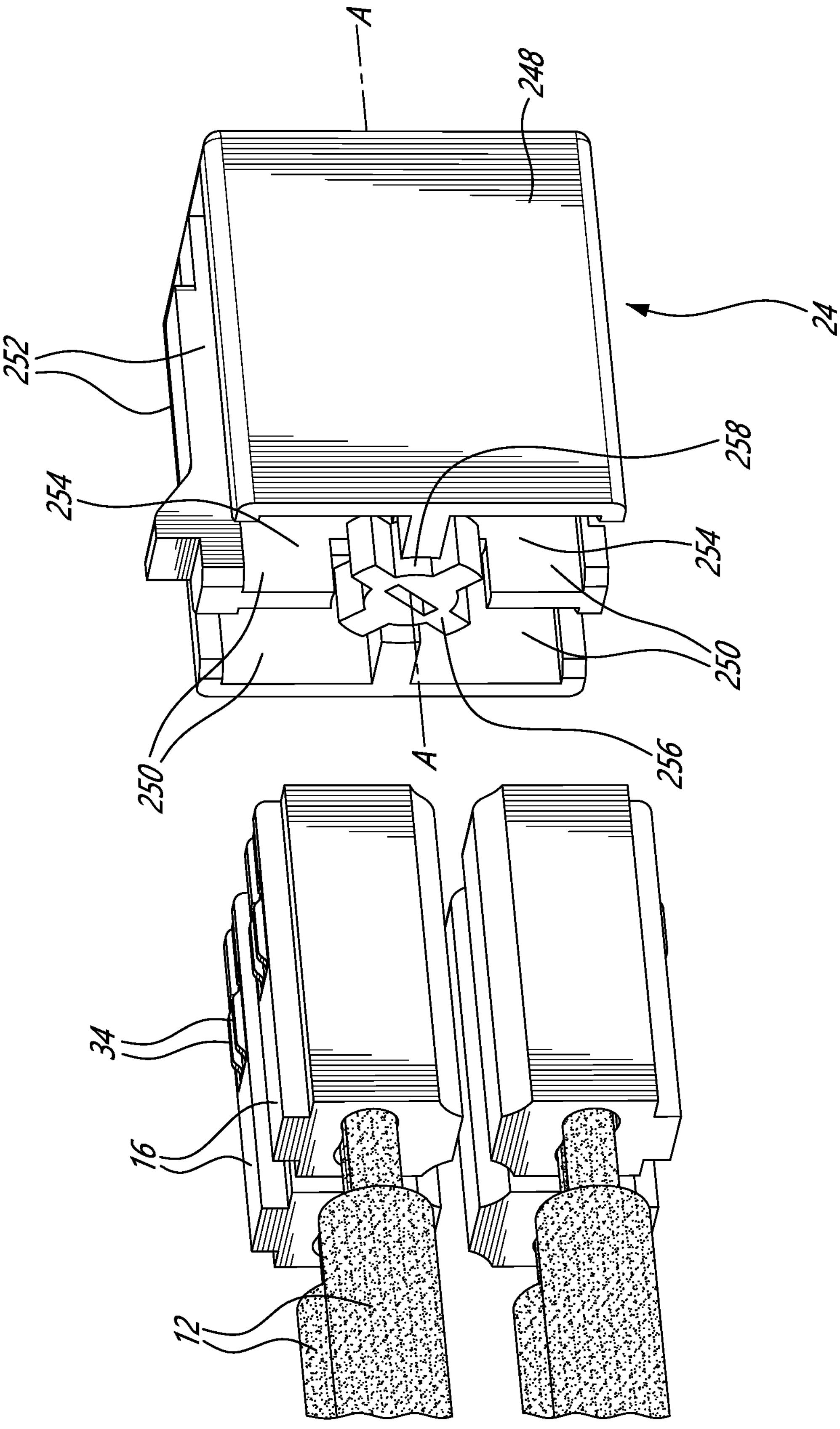
FIG. 14A provides a right perspective view of a cable and caddy with no miniplugs inserted and in accordance with a third alternative embodiment of a caddy of the present invention.

Referring now to FIG. 14A, in a third alternative embodiment, the caddy 24 comprises an outer surface 248 and four chambers 250 in a 2×2 arrangement. Each chamber 250 is dimensioned to receive a respective one of a plurality of miniplugs 16, each miniplug 16 terminating a respective SPE cable 12. An aperture 252 is provided between each chamber and the outer surface 248 of the caddy 24. The apertures 252 align with the pairs of contacts 34 of inserted ones of the miniplugs 16 and such that the contacts 34 are exposed on the outer surface 248. Each chamber 250 comprises a mouth 254 via which a miniplug 16 can be inserted into the chamber 250 and a retaining mechanism.

Figure 14B:
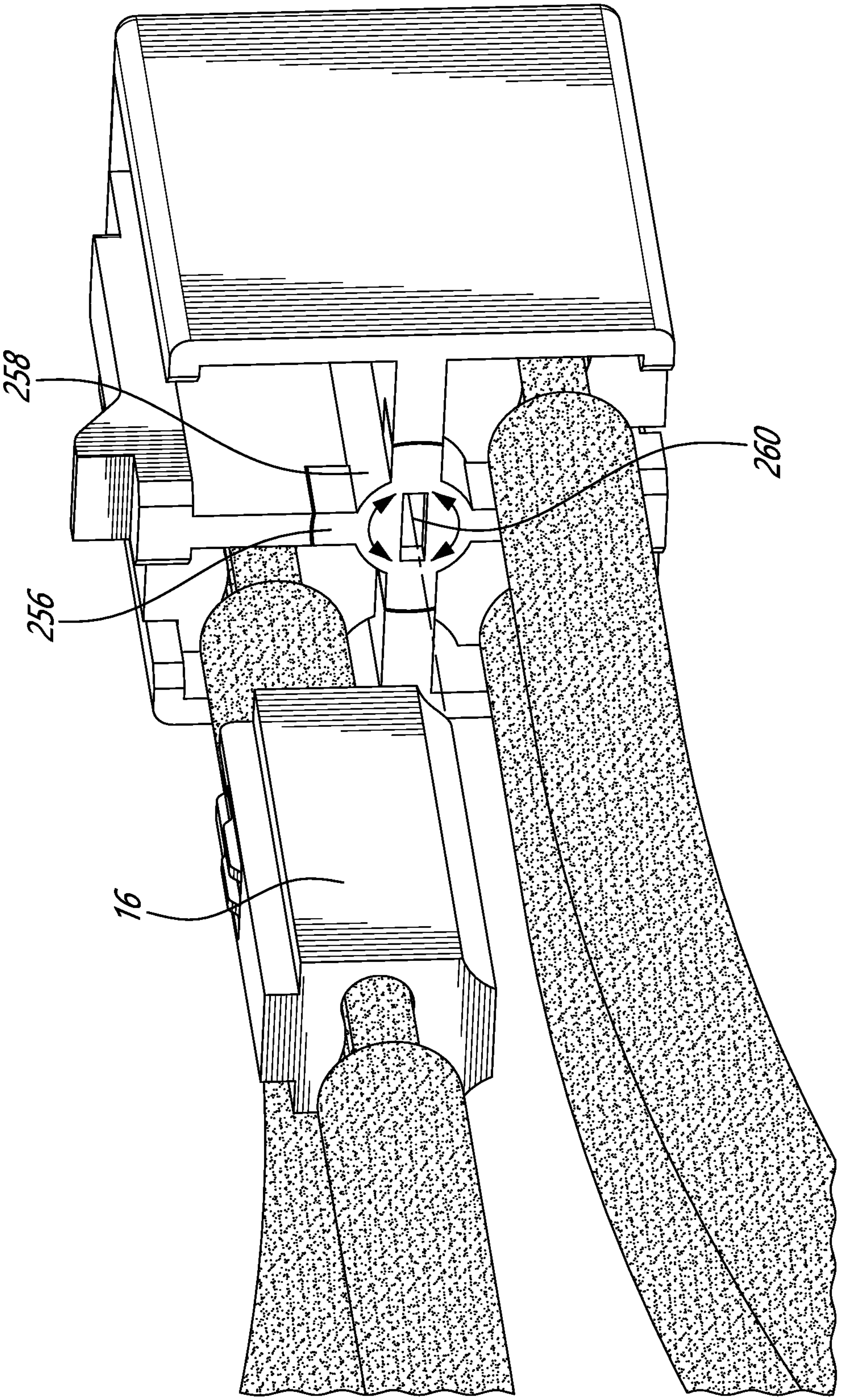
FIG. 14B provides a second right perspective view of a cable and caddy three miniplugs inserted and one miniplug not inserted and in accordance with a third alternative embodiment of a caddy of the present invention.

Referring now to FIG. 14B in addition to FIG. 14A, the retaining mechanism comprises a rotatable wheel 256 attached to the end of an axle (not shown) extending along and arranged for rotation about an axis A. The axis A is illustratively arranged along the line of intersection of the four chambers 250. The wheel 256 extends outwards into the mouth 254 of each of the chambers 250. The wheel 256 comprises at least one cut away portion 258. As shown in FIG. 14B, at a first angle of rotation the cutaway portion 258 is positioned in the mouth 254 of at least one of the chambers 250 such that a miniplug 16 can be inserted into or removed from the chamber 250. In this regard, the miniplug 16 may include flutes 259 along a length thereof in order to provide extra clearance for the well 256 during insertion and removal. As shown in FIG. 14A, at a second rotation at least part of the wheel 256 extends into the mouth 254 of the chambers 250 such that the miniplug 16 would be prevented from being removed or inserted into one of the chambers. In a particular embodiment a slot 260 for receiving a tool such as a screwdriver (not shown) or the like in order to rotate the wheel about the axis A to the selected position.

Figure 15A:
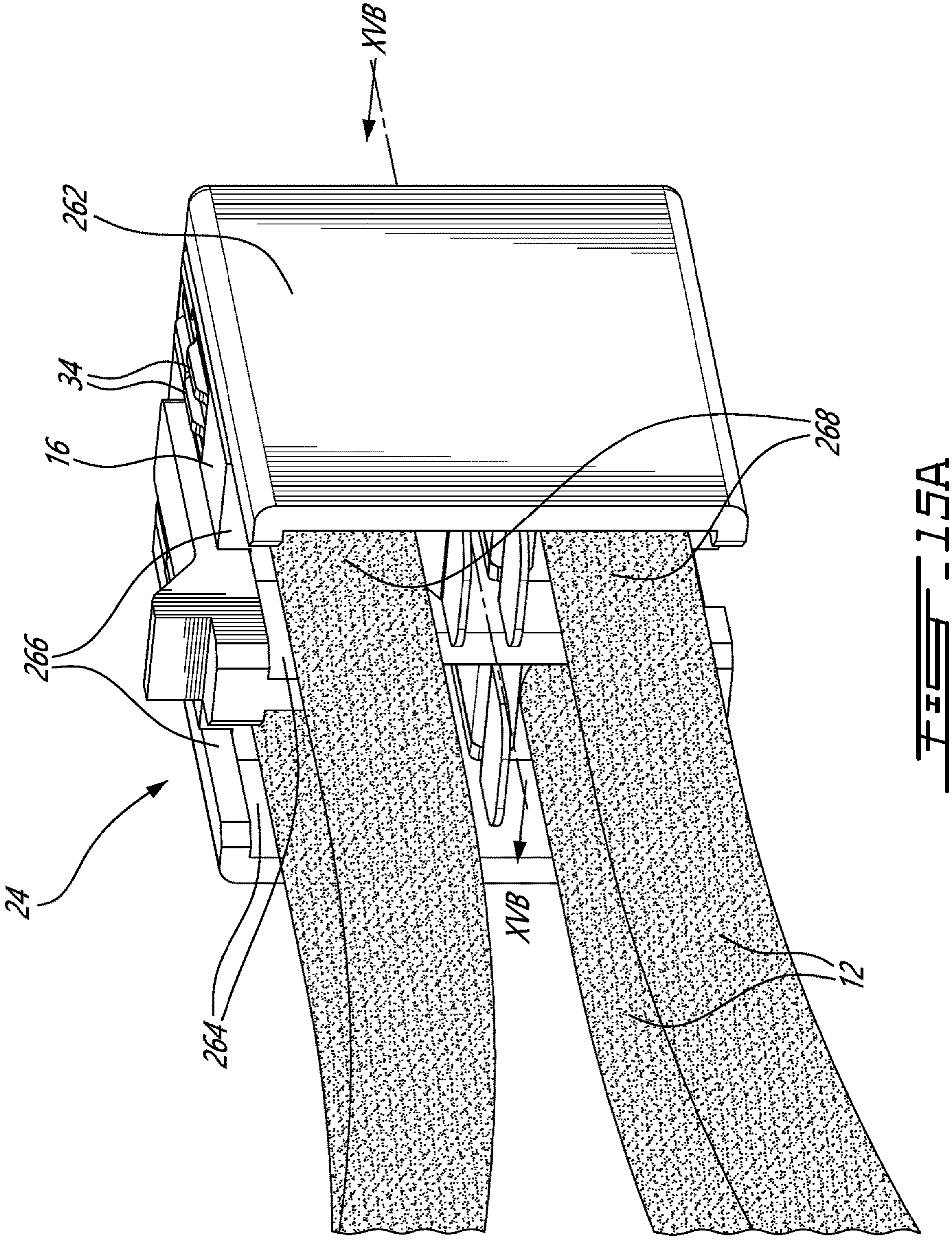
FIG. 15A provides a right perspective view of a cable and caddy with miniplugs inserted and in accordance with a fourth alternative embodiment of a caddy of the present invention.

Referring now to FIG. 15A, in a fourth alternative embodiment, the caddy 24 comprises a housing 262 and four chambers 264 in a 2×2 arrangement. Each chamber 264 is dimensioned to receive a respective one of a plurality of miniplugs 16, each miniplug 16 terminating a respective SPE cable 12. An aperture 266 is provided between each chamber and the outer surface of the housing 262. The apertures 266 align with the pairs of contacts 34 of inserted ones of the miniplugs 16 and such that the contacts 34 are exposed on the outer surface of the housing 262. Each chamber 264 comprises a mouth 268 via which a miniplug 16 can be inserted into the chamber 264 and a retaining mechanism.

Figure 15B:
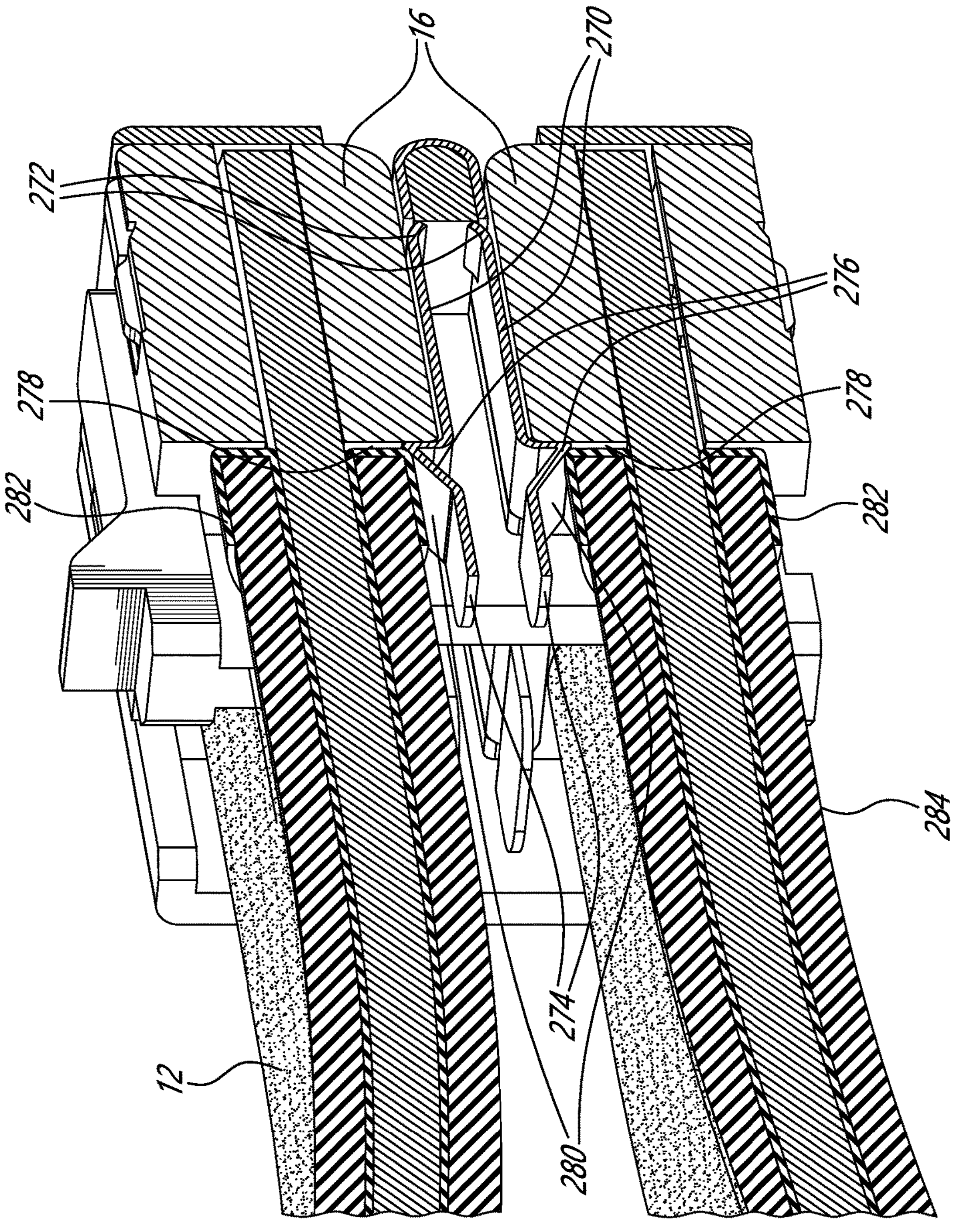
FIG. 15B provides a sectional view along line XVB-XVB in FIG. 15A.

Referring now to FIG. 15B in addition to FIG. 15A, the retaining mechanism a lever 270 associated with each chamber 264 and comprising a fixed end 272 secured to the caddy housing 262 and a flexible end 274 extending out of the chamber 264. Each flexible end 274 comprises a tab 276 which engages with a back end 278 of the miniplug 16. As the miniplug 16 is inserted into the chamber 264 via the chamber mouth 268, a forward bevelled edge 280 of the tab 276 is engaged by the miniplug 16 thereby flexing the flexible end 274 and moving the tab 276 out of the path of the miniplug 16. When the miniplug 16 is fully inserted into the chamber 264, the tab 276 is biased behind the back end 278 of the miniplug 16 by the flexing of the flexible end 274 thereby securing the miniplug 16 in the chamber 264. In a particular embodiment the levers 270 are arranged as pairs and fabricated from a single piece of a metal such as nickel plated spring steel or the like and which are secured at the fixed ends 272 to the housing 262. In a particular embodiment the cable 12 includes a grounding shield 282 a portion of which is exposed on an outer surface 284 of the cable 12 adjacent the mini plug. As the tab 276 is biased behind the back end 278 of the miniplug 16 the tab 276 comes into contact with the grounding shield 282 of each of the cables 12. As the levers 270 and therefore the tabs 276 are manufactured from a single piece of conductive material, a conductive path between the grounding shield 282 of each of the cables 12 is provided.

Still referring to FIG. 15B, a person of ordinary skill in the art will now understand that a miniplug 16 can be removed from its respective chamber 264 by flexing the flexible end 274 such that the tab 276 is moved out from behind the back end 278 of the miniplug 16 while pulling the SPE cable 12 attached to the miniplug 16.

Although the present invention has been described hereinabove by way of specific embodiments thereof, it can be modified, without departing from the spirit and nature of the subject invention as defined in the appended claims.

The invention claimed is:

1. An assembly configured to convert a connection of a single pair ethernet (SPE) cable to a standardized connection, comprising:
- a miniplug configured to connect to a first end portion of the SPE cable at first end of the miniplug, wherein the miniplug comprises:
  - a plug housing configured to receive no more than two conductor portions defined in the first end portion of the SPE cable;
  - no more than two contact portions defined through a surface of the plug housing; and
  - wherein the no more than two contact portions are in electrical contact with a respective one of the no more than two conductor portions;
- a receiving body configured to be connected to a second end of the miniplug at a first end of the receiving body, wherein the receiving body comprises:
  - a housing comprising at least one receptacle defined in a first end of the housing, wherein the receptacle is configured to receive the second end of the miniplug;
  - no more than two receiving portions disposed in the housing, wherein the two receiving portions connect to the two contact portions when the second end of the miniplug is received within the receptacle;
  - a plug disposed at a second end of the housing;
  - no more than two terminal contact portions disposed in the plug, wherein the terminal contacts are electrically connected to the two receiving portions; and
  - wherein the plug is configured to conform to one of a plurality of IEC-63171 standards.

2. The assembly of claim 1, wherein the contact portions comprise piercing contact portions.

3. The assembly of claim 1, wherein the contact portions are configured to be disposed through a pair of corresponding slots defined in a top surface of the first miniplug.

4. The assembly of claim 1, wherein the miniplug further comprises a retainer mechanism disposed on the plug housing.

5. An assembly configured to convert a connection of a single pair ethernet (SPE) cable to a standardized connection, comprising:
- a miniplug configured to connect to a first end portion of the SPE cable at first end of the miniplug;
- a receiving body configured to be connected to a second end of the miniplug at a first end of the receiving body;
- wherein the miniplug includes a plug housing configured to receive no more than two conductor portions defined in the first end portion of the SPE cable and no more than two contact portions defined through a surface of the plug housing that are in electrical contact with a respective one of the no more than two conductor portions;
- wherein the receiving body includes a housing with a receptacle defined in a first end of the housing that is configured to receive the second end of the miniplug and no more than two receiving portions disposed in the housing that are connected to the two contact portions and to no more than two terminal contact portions of a plug disposed at a second end of the housing; and
- wherein the plug is configured to conform to one of a plurality of IEC-63171 standards.

6. The assembly of claim 5, wherein the two receiving portions are configured to connect to the two contact portions when the second end of the miniplug is received within the receptacle.

7. The assembly of claim 5, wherein the terminal contact portions of the plug are configured to be electrically connected to the two receiving portions of the housing.

8. The assembly of claim 5, wherein each of the two contact portions are configured to be inserted through an insulated portion of the first end portion of the SPE cable and are configured to be in electrical contact with a corresponding one of the conductor portions defined in the first end portion of the SPE cable.

9. The assembly of claim 5, wherein the receiving body comprises a releasable latch mechanism configured to retain the miniplug in the receiving body when the miniplug is received within the receptacle.

10. The assembly of claim 9, wherein the releasable latch mechanism is configured to releasably engage with a retainer mechanism disposed on the miniplug when the miniplug is received within the receptacle.

11. An assembly configured to convert a connection of a single pair ethernet (SPE) cable to a standardized connection, comprising:

a miniplug configured to connect to a first end portion of the SPE cable at first end of the miniplug;

a receiving body configured to be connected to a second end of the miniplug at a first end of the receiving body;

wherein the receiving body comprises a plug disposed at a second end of the receiving body; and wherein in the plug is configured to be electrically connected to no more than two conductor portions within the first end of the SPE cable and is configured to conform to one of a plurality of IEC-63171 standards.

12. The assembly of claim 11, wherein the miniplug comprises a plug housing configured to receive the two conductor portions defined in the first end portion of the SPE cable.

13. The assembly of claim 11, wherein the miniplug comprises no more than two contact portions defined through a surface of the miniplug.

14. The assembly of claim 13, wherein each of the two contact portions are configured to be in electrical contact with a corresponding one of the conductor portions defined in the first end of the SPE cable.

15. The assembly of claim 11, wherein the receiving body comprises a housing with at least one receptacle defined in a first end of the housing.

16. The assembly of claim 15, wherein the housing comprises no more than two receiving portions that are configured to electrically connect to the two conductor portions of the first end of the SPE cable when the second end of the miniplug is received within the receptacle.

17. The assembly of claim 16, wherein the plug comprises no more than two terminal contact portions that are configured to connect to the two receiving portions of the housing.

18. The assembly of claim 11, wherein the receiving body comprises an adaptor, wherein the adaptor comprises a first part configured to be connected to the second end of the miniplug and a second part removably connected to the first part.

19. The assembly of claim 18, wherein a first end of the first part comprises a receptacle configured to receive the second end of the miniplug therein.

20. The assembly of claim 18, wherein the plug is disposed on a second end of the first part of the adaptor.

* * * * *